(12) United States Patent
Shinohara et al.

(10) Patent No.: US 8,972,139 B2
(45) Date of Patent: Mar. 3, 2015

(54) METHODS AND SYSTEMS FOR CONTROLLING AN ELECTRIC MOTOR

(71) Applicant: Honda Motor Co., Ltd., Tokyo (JP)

(72) Inventors: Sei Shinohara, Utsunomiya (JP); Keiichi Ooiso, Utsunomiya (JP); Satoshi Andou, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 118 days.

(21) Appl. No.: 13/767,366

(22) Filed: Feb. 14, 2013

(65) Prior Publication Data
US 2013/0218381 A1  Aug. 22, 2013

(30) Foreign Application Priority Data

Feb. 21, 2012 (JP) ................. 2012-035530

(51) Int. Cl.
| | |
|---|---|
| G06F 7/70 | (2006.01) |
| G06F 19/00 | (2011.01) |
| G06G 7/00 | (2006.01) |
| G06G 7/76 | (2006.01) |
| B60W 10/08 | (2006.01) |
| B60W 10/18 | (2012.01) |
| B60K 6/52 | (2007.10) |
| B60W 30/18 | (2012.01) |

(52) U.S. Cl.
CPC ............. *B60W 10/08* (2013.01); *B60W 10/18* (2013.01); *B60K 6/52* (2013.01); *B60W 30/18109* (2013.01); *B60W 2510/088* (2013.01); *B60W 2510/182* (2013.01); *B60W 2710/083* (2013.01); *Y02T 10/6265* (2013.01); *B60T 2270/604* (2013.01)
USPC ............................................. 701/70; 701/22

(58) Field of Classification Search
USPC ......................................... 701/22, 36, 70, 71
See application file for complete search history.

(56) References Cited

U.S. PATENT DOCUMENTS 5,427,196 A * 6/1995 Yamaguchi et al. ........ 180/65.21
6,321,865 B1 * 11/2001 Kuribayashi et al. ......... 180/243

FOREIGN PATENT DOCUMENTS

JP 2010-235051 10/2010

* cited by examiner

*Primary Examiner* — Rami Khatib
(74) *Attorney, Agent, or Firm* — Andrew Kefalonitis Jr.

(57) ABSTRACT

A control system that performs control of an electric motor is described. The control system may include a rotating body inertia torque computing unit that uses a rotational state of a vehicle wheel when braking is applied to the wheel to calculate an inertia torque of rotating bodies residing within a span behind the wheel, among members that rotate by the driving force of the electric motor. The control system also may include a controller that performs control of the electric motor to cancel the inertia torque of the rotating bodies based on the calculation result from the rotating body inertia torque computing unit.

15 Claims, 19 Drawing Sheets

METHODS AND SYSTEMS FOR CONTROLLING AN ELECTRIC MOTOR

CROSS REFERENCE TO RELATED APPLICATION

The present application claims priority under 35 U.S.C. §119 to Japanese Patent Application No. 2012-035530, filed Feb. 21, 2012, entitled "CONTROL SYSTEM," the contents of which are incorporated herein by reference in their entirety.

BACKGROUND

The embodiments described herein relate generally to electric/hybrid vehicles, and more specifically, to methods and systems for controlling operation of a vehicle.

Control devices used in vehicles have conventionally been proposed to provide an electric motor and a planetary gear type speed reducer for each of two rear wheels. The planetary gear type speed reducer is provided with a sun gear, a plurality of planetary gears that mesh with the sun gear, a planetary carrier that supports the planetary gears, and a ring gear that meshes with the outer periphery side of the planetary gears.

The output shaft of the electric motor is configured to output to the sun gear of the planetary gear type speed reducer. The ring gear is supported to freely rotate in a planetary gear type speed reducer case that covers the planetary gear type speed reducer. A one-way clutch and a hydraulic brake that controls the rotation of the ring gear are provided in a space between the outer radial side of the planetary gear type speed reducer and the planetary gear type speed reducer case. The one-way clutch is provided to lock the rotation of the ring gear when reverse rotational directional torque acts on the ring gear when the rotational direction of the sun gear is in a normal rotational direction as a vehicle advances forward. The planetary carrier is connected to the output shaft of the planetary gear type speed reducer, and the output shaft is connected to the drive shaft provided between the rear wheels. The drive shaft is configured to be connected to the rear wheels through the rear wheel axle.

In this type of configuration, the driving force of the electric motor is input into the sun gear of the planetary gear type speed reducer, and a reduced driving force is output from the planetary gear type speed reducer through the planetary carrier. When the vehicle is running forward by the driving force of the electric motor, the ring gear is locked by the one-way clutch, and thus, the driving force of the electric motor is output to the drive shaft. The output to the drive shaft is conveyed to the rear wheels through the rear wheel axle.

However, in this type of vehicle, a large amount of torsional torque is generated in a drive shaft provided between the rear wheels and the output shaft of the planetary gear type speed reducer when the rear wheels lock due to a driver suddenly pressing on the brake when the vehicle is running forward by the driving force of the electric motor.

FIG. 18A shows a vehicle and an expanded view of a vehicle running gear and wheel. More specifically, FIG. 18A illustrates a case where the vehicle is running forward by the driving force of an electric motor during normal driving. In the figure, an output shaft of a rotor 15 included in the electric motor is connected to an input shaft of a planetary gear type speed reducer 12. When a vehicle 3 is running forward by the driving force of the electric motor, the rotational speed of the rotor 15 of the electric motor is controlled at a rotational speed several times greater than that of a rear wheel Wr to accommodate the reduction ratio of the planetary gear type speed reducer 12. Control of the electric motor during normal driving is performed from the perspective of fuel consumption improvement of the vehicle overall and from the perspective of ride quality improvement for the driver based on the assumption that vehicle control is being performed according to operations by the driver.

The output shaft of the planetary gear type speed reducer 12 is connected to one end of a drive shaft 71. Further, another end of the drive shaft 71 is connected to the axle (not illustrated) provided for the rear wheel Wr.

In this type of configuration, when the vehicle 3 is running forward by the driving force of the electric motor, the driving force from the rotor 15 of the electric motor is transferred to the drive shaft 71 in a decelerated state via the planetary gear type speed reducer 12, and this is transferred to the rear wheel Wr. Therefore, the vehicle 3 advances forward by the driving force of the electric motor.

Meanwhile, FIG. 18B illustrates "locking of the rear wheels Wr due to sudden braking" when the driver at the time of normal driving as illustrated in FIG. 18A applies the brakes suddenly. Torsional torque is generated in the drive shaft at the time of sudden braking.

In FIG. 18B, the rear wheels Wr are locked. Moreover, as stated here, "locking of the rear wheels Wr due to sudden braking," also includes cases in which the rear wheels Wr lock for other reasons or when a similar situation to this occurs. Therefore, it is not limited to when sudden braking is applied but also includes an antilock brake system (ABS) activating on rear wheels Wr when brakes are applied on a low coefficient of friction (μ) road, rear wheels Wr locking due to side brake operation, and rear wheels Wr locking due to a parking brake being operated.

With respect to this, because normal running control has been undertaken so far in the electric motor, torque is generated by the rotor 15 as the rotor 15 tries to continue rotating in the same direction as before due to intrinsic inertia (hereinafter, torque generated by the intrinsic inertia held by a rotating body such as the rotor 15 will be referred to as "inertia torque").

FIG. 19 is a diagram for explaining the mechanism that generates excess torque on the drive shaft at the time of sudden braking. In the figure, when the vehicle 3 is running forward by the driving force of the electric motor, the driver applies sudden braking at a time Ta resulting in the rear wheels Wr of the vehicle 3 being locked.

The rotor 15 of the electric motor is rotating at high speed at the time Ta. Therefore, because the rotor 15 drives the rear wheels Wr that are attempting to lock due to the inertia torque of the wheels themselves, torsional torque is generated in the drive shaft 71. Because a planetary gear type speed reducer 12 is provided between the rotor 15 and the drive shaft 71, the torque is increased according to the reduction ratio of the planetary gear type speed reducer 12, and as a result, excess torque is generated on the drive shaft 71 that is connected to the output shaft of the planetary gear type speed reducer 12. Furthermore, because the sun gear, planetary gears, and planetary carrier, which are component parts of the planetary gear type speed reducer 12, are also rotating at high speed at the time Ta, inertia torque due to their own inertia is also added to the drive shaft 71 making the excess torque on the drive shaft 71 even larger.

When considering durability of the drive shaft 71, this excess torque is problematic.

Moreover, after such excess torque is generated, the intrinsic elasticity in the drive shaft 71 generates torque on the drive shaft 71 to rotate the rotor 15 in the opposite direction. Therefore, the rotor 15 momentarily rotates in the reverse rotational direction until the vehicle speed and the rotational speed of the motor converge together at zero at a time Tb thereafter.

Conventionally, the generation of excess torque in the type of drive shaft 71 described above has been handled by increasing the strength of the drive shaft 71. However, increases in the weight and dimension of the components cause fuel consumption of the vehicle 3 to worsen. Further, increasing the size of the components leads to restrictions in the layout of the drive train.

SUMMARY

In one aspect, a system for controlling an electric motor that drives a wheel is provided. The system includes a processor that uses a rotational state of the wheel when braking is applied to the wheel to calculate an inertia torque of a rotating body that resides in a span behind the wheel, among members that rotate by a driving force of the electric motor. The system also includes a controller that performs control of the electric motor to cancel the inertia torque of the rotating body based on the calculation result from the processor when braking is applied.

In another aspect, an electric motor control system included within a vehicle and communicatively coupled to at least one electric motor is provided. The electric motor is included within a running gear configured to rotate a drive shaft coupled to a first vehicle wheel. The running gear also includes a speed reducer coupled between the electric motor and the drive shaft. The control system includes a brake detector configured to receive a signal corresponding to a level of vehicle braking, identify sudden braking, and output a sudden braking signal when sudden braking is identified. The control system also includes an inertia torque computing unit configured to determine an inertia torque of at least one rotating component included within the running gear and to determine a first torque command value based at least partially on the inertia torque. The control system also includes a torque command value selector configured to receive the first torque command value and the sudden braking signal and to determine a first motor command value based at least partially on the first torque command value.

In yet another aspect, a method for controlling an electric motor included in a vehicle is provided. The electric motor is included within a running gear configured to rotate a drive shaft, which is coupled to at least one vehicle wheel. The running gear also includes a speed reducer coupled between the electric motor and the drive shaft. The method includes receiving, at an electronic control unit (ECU), a braking signal corresponding to a level of vehicle braking. The method also includes determining, using the ECU, an occurrence of sudden braking based on the signal and determining an inertia torque of at least one rotating component included within the running gear. The method also includes determining a first torque command value based at least partially on the inertia torque that when applied to operation of the electric motor, reduces the inertia torque of the at least one rotating component that is transferred to the drive shaft during sudden braking. The method also includes providing a first motor command value to the electric motor, the first motor command value based at least partially on the first torque command value.

DETAILED DESCRIPTION

Figure 1:
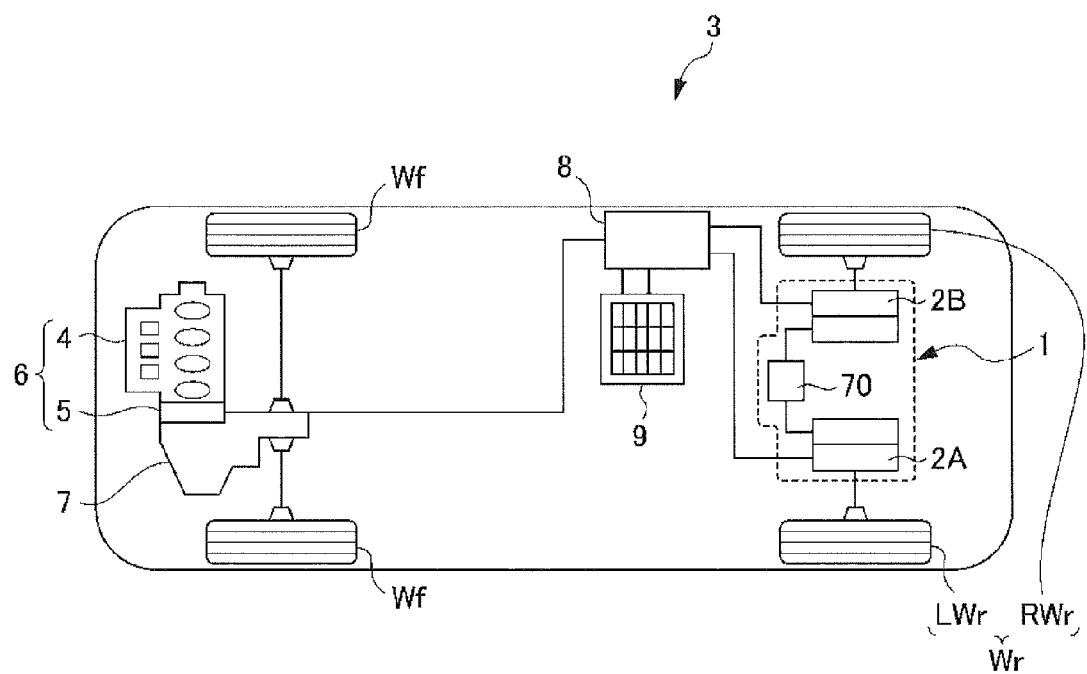
FIG. 1 is a diagram of an exemplary vehicle that includes at least one electric motor that provides propulsion force for the vehicle.

Various embodiments described herein include a control system (e.g., a control system 100 shown in FIG. 11) that performs control of an electric motor (e.g., electric motors 2A and/or 2B shown in FIG. 1) that drives a wheel (e.g., a wheel LWr and/or RWr shown in FIG. 1). More specifically, in the exemplary embodiment, the control system is provided with a processor (e.g., rotating body inertia torque computing unit 93 shown in FIG. 12) that uses a rotational state of the wheel when braking is applied to the wheel to calculate an inertia torque of a rotating body that resides in a span behind the wheel, among members that rotate by a driving force of the electric motor. Furthermore, the control system may include a controller (e.g., an adder 94, torque command value selector 95, motor ECU 81a and 81b, and PDU 80a and 80b shown in FIG. 12) that performs control of the electric motor to cancel the inertia torque of the rotating body based on the calculation result from the processor when braking is applied.

According to at least one embodiment, because the rotational state of the wheel when braking is applied to the wheel is used to calculate the inertia torque of a rotating body that resides in a span behind the wheel, among the members that rotate by the driving force of the electric motor, and the electric motor is controlled to cancel the inertia torque of the rotating body based on the calculation result when braking is applied, the generation of excess torque that accompanies the inertia torque of the rotating body can be prevented in members that reside in the span between the electric motor and the wheel.

Furthermore, the braking may include at least one from among a brake pedal being operated, activation of an antilock brake system, a side brake being operated, or a parking brake being operated.

Because the configuration uses a brake pedal being operated, activation of an antilock brake system, a side brake being operated, or a parking brake being operated to detect a state where a wheel may tend to lock, existing sensor outputs and the like can be used and a simple configuration can be adopted.

Moreover, regenerative control of the electric motor may be performed based on the calculation result.

Because regenerative control is performed on the electric motor to cancel that portion of the torque that corresponds to the inertia torque of the rotating body, the rotational speed of the electric motor can be quickly reduced.

Furthermore, a wheel lock determiner, such as wheel lock determining unit 199 (shown in FIG. 15), may determine whether a wheel is locked due to the braking, wherein the controller performs control based on the calculation result when the wheel lock determiner determines that the wheel is locked.

Because the configuration provides the wheel lock determiner that determines whether the wheel is locked, preventive control of excess torque generation can be performed smoothly according to the rotational state of the wheel.

Moreover, an electric motor may be provided for each wheel of a plurality of wheels, and control of the electric motor may be performed for each of the electric motors. In this case, the processor calculates the inertia torque of the rotating body for each wheel and the controller performs control based on the calculation result from the processor.

Because preventive control of excess torque generation can be performed on each wheel, preventive control of excess torque generation can be performed smoothly according to the rotational state of each wheel.

In the exemplary embodiment, a control system of a vehicle is provided that prevents the generation of excess torque in the drive shaft at the time of sudden braking, prevents increases therefrom in the weight and dimension of components, and improves fuel consumption and facilitates layout.

FIG. 1 is a diagram of an exemplary vehicle that includes an electric motor control system. In the illustrated embodiment, a hybrid vehicle 3 has a drive unit 6 in the front of the vehicle where an internal combustion engine 4 and an electric motor 5 are connected in-line, and the motive power of the drive unit 6 is conveyed to front wheels Wf via a transmission 7. Meanwhile, motive power of a running gear 1 that includes electric motors 2A and 2B provided in the rear of the vehicle separately from the drive unit 6 is transferred to rear wheels Wr (RWr and LWr).

The electric motor 5 of the front wheel Wf side and the electric motors 2A and 2B of the rear wheel Wr side are both connected to a battery 9 via a Power Drive Unit 8 (PDU). The PDU 8 is configured to control the power supply from the battery 9 and energy regeneration to the battery 9. Moreover, an explanation of the control system for controlling electric motors 2A, 2B, and 5 of the vehicle 3 will be given in detail below.

Further, friction brakes (not shown in FIG. 1) are provided on each of the four wheels Wf and Wr. This friction brake may include, for example, a hydraulic-type disc brake. When the driver presses the brake pedal, the pressing force is amplified and conveyed to the brake pad via a hydraulic cylinder or the like to generate friction between the brake pad and the brake disc attached to each of the wheels Wf and Wr. In this manner, rotational energy of the brake disk (in other words the wheels Wf and Wr) is converted into heat energy, and thus braking is performed for the wheels Wf and Wr.

Figure 2:
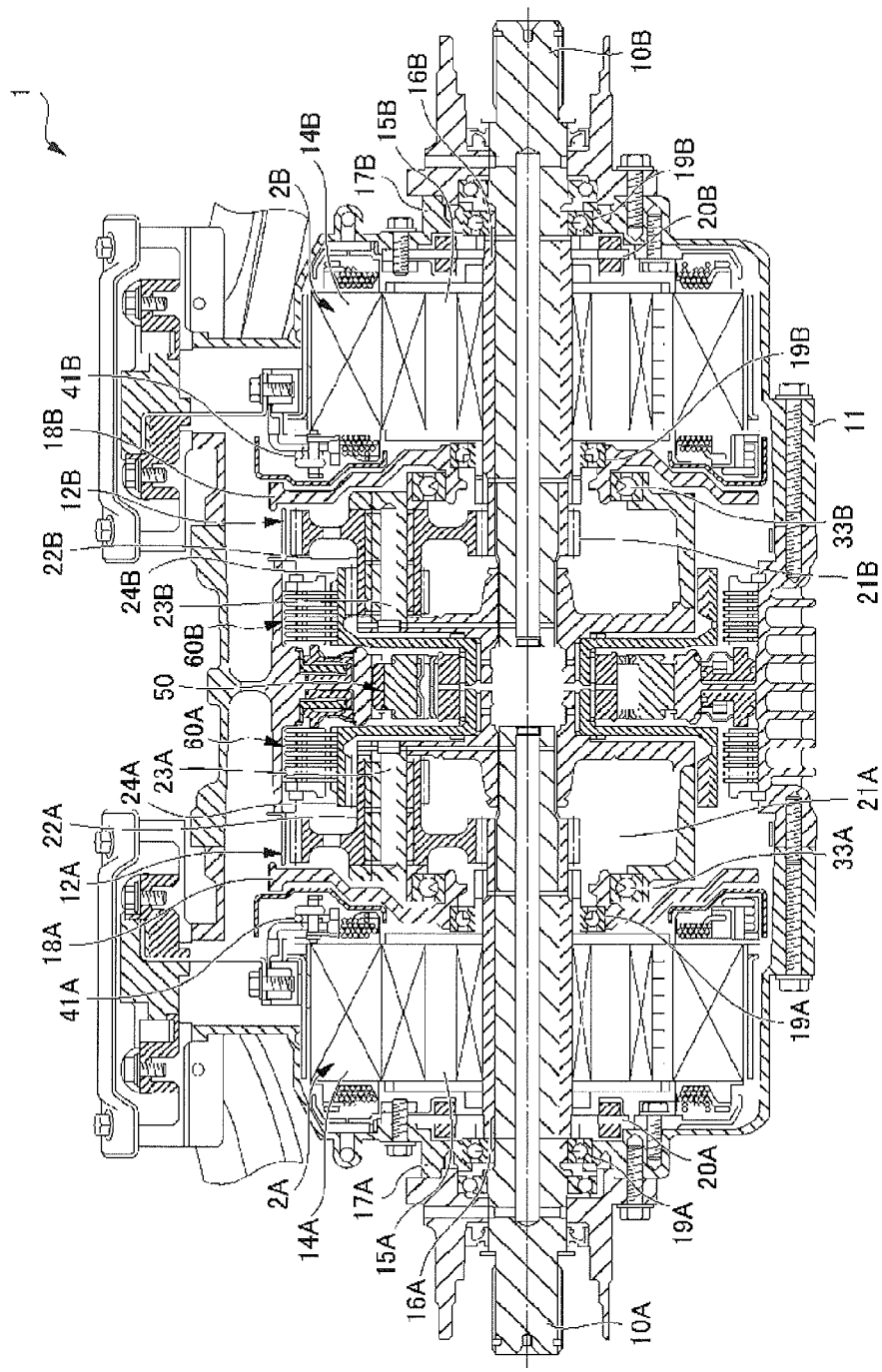
FIG. 2 is a longitudinal sectional view of an exemplary running gear that may be included in the vehicle shown in FIG. 1.
Figure 3:
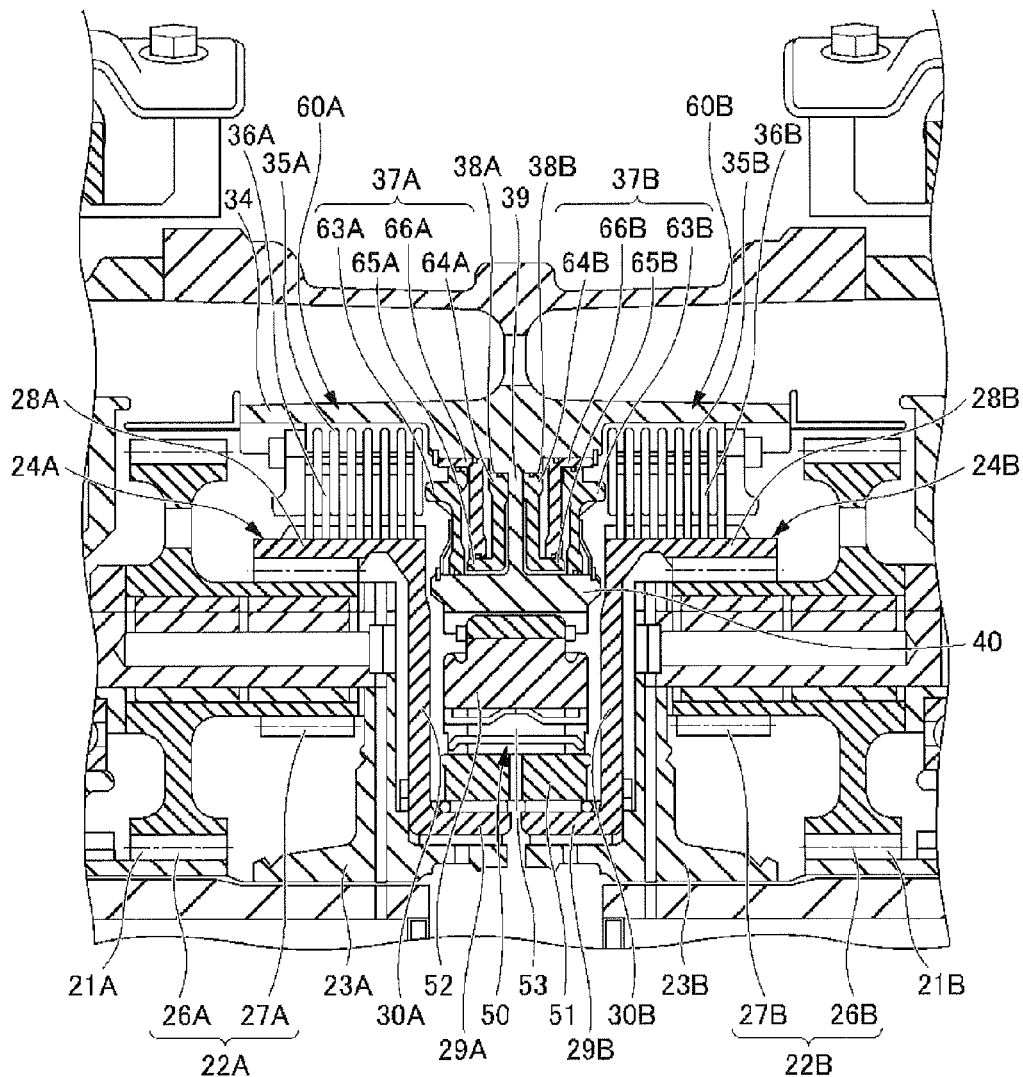
FIG. 3 is a magnified view of a portion of the running gear shown in FIG. 2.

FIG. 2 is a longitudinal sectional view of an exemplary embodiment of running gear 1 (shown in FIG. 1). FIG. 3 is a magnified view of a portion of the running gear 1 of FIG. 2.

In these figures, the running gear 1 has left and right output shafts 10A and 10B to transfer the driving force to each rear wheel RWr and LWr of the vehicle 3, which are respectively arranged along a same axis in the vehicle width direction. These output shafts 10A and 10B are configured to connect to the axle shaft of each rear wheel RWr and LWr through a drive shaft 71 (not shown in FIG. 2). In the exemplary embodiment, a speed reducer case 11 of the running gear 1 is formed in a substantially cylindrical shape overall, and inside thereof, arranged on the same axis as the output shaft 10A and 10B, are the electric motors 2A and 2B for driving the output shafts 10A and 10B, as well as planetary gear type speed reducers 12A and 12B that reduce the drive rotation of the electric motors 2A and 2B. The electric motor 2A and the planetary gear type speed reducer 12A control the left rear wheel LWr while the electric motor 2B and the planetary gear type speed reducer 12B control the right rear wheel RWr, and the electric motor 2A and the planetary gear type speed reducer 12A together with the electric motor 2B and the planetary gear type speed reducer 12B are arranged in lateral symmetry in the vehicle width direction in the speed reducer case 11.

Moreover, in the exemplary embodiment, the speed reducer case 11 is supported by a portion of a frame or the like (not shown in FIG. 2), for example, the frame of the vehicle 3.

Stators 14A and 14B of the respective electric motors 2A and 2B are fixed within an inner part of both the left and right end sides of the speed reducer case 11, and annular rotors 15A and 15B are rotatably arranged on the inner peripheral side of the stators 14A and 14B. Cylindrical shafts 16A and 16B that encompass the outer periphery of output shafts 10A and 10B are joined to the inner peripheral portion of the rotors 15A and 15B, and these cylindrical shafts 16A and 16B are supported via bearings 19A and 19B on intermediate walls 18A and 18B and on end walls 17A and 17B of the speed reducer case 11 so as to be able to relatively rotate on the same axis as the output shafts 10A and 10B. In addition, resolvers 20A and 20B are provided on the end walls 17A and 17B of the speed reducer case 11 that form the outer periphery at one end side of the cylindrical shafts 16A and 16B, in order to feedback positional information on the rotors 15A and 15B to a controller (not shown in the drawings) of the electric motors 2A and 2B.

The planetary gear type speed reducers 12A and 12B are provided with sun gears 21A and 21B, a plurality of planetary gears 22A and 22B that mesh with the sun gears 21, planetary carriers 23A and 23B that support these planetary gears 22A and 22B, and ring gears 24A and 24B that mesh with the outer peripheral side of the planetary gears 22A and 22B. In such configuration, the driving force of the electric motors 2A and 2B is input from the sun gears 21A and 21B and a reduced driving force is output through the planetary carriers 23A and 23B.

The sun gears 21A and 21B are formed integrally with the cylindrical shafts 16A and 16B. In addition, the planetary gears 22A and 22B are dual pinions having second pinions 26A and 26B having a large diameter, which directly match with the sun gears 21A and 21B, and first pinions 27A and 27B having a smaller diameter than second pinions 26A and 26B, and these second pinions 26A and 26B and first pinions 27A and 27B are integrally formed in an offset state along a same axis and axial direction. The planetary gears 22A and 22B are supported by the planetary carriers 23A and 23B, and an inner side end portion in the axial direction of the planetary carriers 23A and 23B extends inward in the diametrical direction to be spline fitted to the output shafts 10A and 10B, so as to be integrally and rotatably supported, while also being supported by intermediate walls 18A and 18B via bearings 33A and 33B.

Moreover, intermediate walls 18A and 18B separate the electric motor housing space that contains the electric motors 2A and 2B from the planetary gear type speed reducer space that contains the planetary gear type speed reducers 12A and 12B and are configured to be buckled so that mutual axial spacing from the outer radial side to the inner radial side widens. Further, bearings 33A and 33B that support the planetary gears 22A and 22B are arranged on the inner radial side of the intermediate walls 18A and 18B, as well as on the planetary gear type speed reducer 12A and 12B sides, while bus rings 41A and 41B for the stators 14A and 14B are arranged on the outer radial side of the intermediate walls 18A and 18B, as well as on the electric motor 2A and 2B sides.

The ring gears 24A and 24B are configured so that the inner peripheral surface thereof is provided with gears 28A and 28B that mesh with the small diameter first pinions 27A and 27B, small diameter parts 29A and 29B that are arranged so as to mutually oppose in an intermediate position of the speed reducer case 11 with a diameter smaller than the gear parts 28A and 28B, and coupling units 30A and 30B that couple the inner side end portion in the axial direction of the gear parts 28A and 28B to the outer side end portion in the axial direction of the small diameter parts 29A and 29B in the diametrical direction.

In this embodiment, the maximum radius of the ring gears 24A and 24B is set to be smaller than the maximum distance from the center of the output shafts 10A and 10B of the second pinions 26A and 26B. The small diameter parts 29A and 29B are supported to freely rotate via a bearing 43 on a cylindrical supporter 42 of the speed reducer case 11 that faces the outer side in the diametrical direction and are coupled by a retaining ring 44. The cylindrical supporter 42 extends to the planetary gear type speed reducer 12A side from the inner radial side end portion of a support wall 39 that extends to the diametrical direction inner side from a biased position on the planetary gear type speed reducer 12B side in an approximately center portion of the speed reducer case 11.

A cylindrical airspace is secured between the speed reducer case 11 and the ring gear 24A, and within this airspace, a hydraulic brake 60 that performs braking on the ring gears 24A and 24B is arranged to overlap in the diametrical direction with the second pinion 26A and to overlap in the axial direction with the first pinion 27A. The hydraulic brake 60 is configured so that a plurality of fixed plates 35 spline fitted to the inner peripheral surface of the speed reducer case 11 are alternately arranged in the axial direction with a plurality of rotation plates 36 spline fitted to the outer peripheral surface of the ring gear 24A, and these plates 35 and 36 are configured to engage and release according to an annular piston 37. The piston 37 is housed to freely advance and retreat in an annular cylinder chamber 38 formed between the cylindrical supporter 42, the support wall 39, and the speed reducer case 11, and the piston 37 advances by the induction of high pressure oil into the cylinder chamber 38, and the piston 37 retreats by discharging the oil from the cylinder chamber 38. In the exemplary embodiment, the hydraulic brake 60 is connected to an oil pump 70 (shown in FIG. 1).

More specifically, the piston 37 has a first piston wall 63 and a second piston wall 64 in the front and rear in the axial direction, and these piston walls 63 and 64 are coupled by an inner peripheral wall 65 having a cylindrical shape. Accordingly, an annular space is formed between the first piston wall 63 and the second piston wall 64 that opens to the outer side in the diametrical direction, and this annular space is partitioned in the front and rear in the axial direction by a partitioning member 66 fixed to the inner peripheral surface of the outer wall of the cylinder chamber 38. A second activation chamber where high-pressure oil is directly inducted is provided between the support wall 39 of the speed reducer case 11 and the second piston wall 64, and a first activation chamber that communicates with the second activation chamber via a through hole formed in the inner peripheral wall 65 is provided between the partitioning member 66 and the first piston wall 63. Conduction between the second piston wall 64 and the partitioning member 66 is performed at atmospheric pressure.

According to the hydraulic brake 60, high-pressure oil is inducted into the second activation chamber and the first activation chamber causing the fixed plate 35 and the rotation plate 36 to mutually press according to the pressure of the oil applied to the first piston wall 63 and the second piston wall 64. Accordingly, because, a large pressure receiving area can be garnered by the first and second piston walls 63 and 64 in the front and rear in the axial direction, a large pressing force can be obtained on the fixed plate 35 and a rotation plate 36 while suppressing the area in the diametrical direction of the piston 37.

In the case of this hydraulic brake 60, because the fixed plate 35 is supported by the speed reducer case 11 and the rotation plate 36 is supported by the ring gear 24A, when both plates 35 and 36 are pressed by the piston 37, a braking force acts on the ring gears 24A and 24B mutually coupled by a frictional engagement between both plates 35 and 36, and thus the ring gears 24A and 24B are fixed. Meanwhile, when the engagement by the piston 37 is released from this state, free rotation of the coupled ring gears 24A and 24B is allowed.

A cylindrical airspace is also secured between the speed reducer case 11 and the ring gear 24B, and within this airspace, a one-way clutch 50 is arranged so that motive power is transferred in only one direction relative to the ring gears 24A and 24B and motive power in other directions is blocked. The one-way clutch 50 is configured by interposing a plurality of sprags 53 between an inner race 51 and an outer race 52, and the inner race 51 is integrally configured with the gear 28B of the ring gear 24B. Further, the outer race 52 is positioned according to the inner peripheral surface of the speed reducer case 11 and prevented from turning.

The one-way clutch 50 engages when the vehicle 3 is running forward by the driving force of the electric motors 2A and 2B and is configured to lock the rotation of the ring gears 24A and 24B. More specifically, the one-way clutch 50 is configured to lock or release the ring gears 24A and 24B according to the active direction of torque applied to the ring gears 24A and 24B. If the rotational direction of the sun gears 21A and 21B when the vehicle advances forward is taken as the normal rotational direction, then when torque is applied in a reverse rotational direction to the ring gears 24A and 24B, the rotation of the ring gears 24A and 24B is made to lock.

In the running gear 1 configured in this manner, the planetary gear type speed reducers 12A and 12B face the axial direction in the center portion, and the ring gear 24A of the planetary gear type speed reducer 12A is coupled to the ring gear 24B of the planetary gear type speed reducer 12B, and the coupled ring gears 24A and 24B are supported to freely rotate via the bearing 43 on the cylindrical supporter 42 of the speed reducer case 11. Furthermore, the hydraulic brake 60 is provided in the space between the outer radial side of the planetary gear type speed reducer 12A and the speed reducer case 11, the one-way clutch 50 is provided in the space between the outer radial side of the planetary gear type speed reducer 12B and the speed reducer case 11, and the piston 37 that activates the hydraulic brake 60 on the outer radial side of the bearing 34 is arranged between the hydraulic brake 60 and the one-way clutch 50.

Control of vehicle 3 by the running gear 1 configured in this manner will be explained next. Moreover, FIG. 4 through FIG. 9 illustrate speed collinear diagrams (hereinafter referred to as collinear diagrams) for various situations. S and C on the left side indicate the sun gear 21A of the planetary gear type speed reducer 12A coupled to the electric motor 2A and the planetary carrier 23A coupled to the output shaft 10A, respectively, and S and C on the right side indicate the sun gear 21B of the planetary gear type speed reducer 12B coupled to the electric motor 2B and the planetary carrier 23B coupled to the output shaft 10B, respectively, while R indicates the ring gears 24A and 24B, BRK indicates the hydraulic brake 60, and OWC indicates the one-way clutch 50. In the explanation given above, the rotational direction of the sun gear 21A and 21B at the time of advancing is taken as the normal rotational direction. Furthermore, in the figures, upward from a stopped position is rotation in a normal rotational direction, while downward is rotation in a reverse rotational direction, and an upward arrow indicates torque in a normal rotational direction, while a downward arrow indicates torque in a reverse rotational direction.

Figure 4:
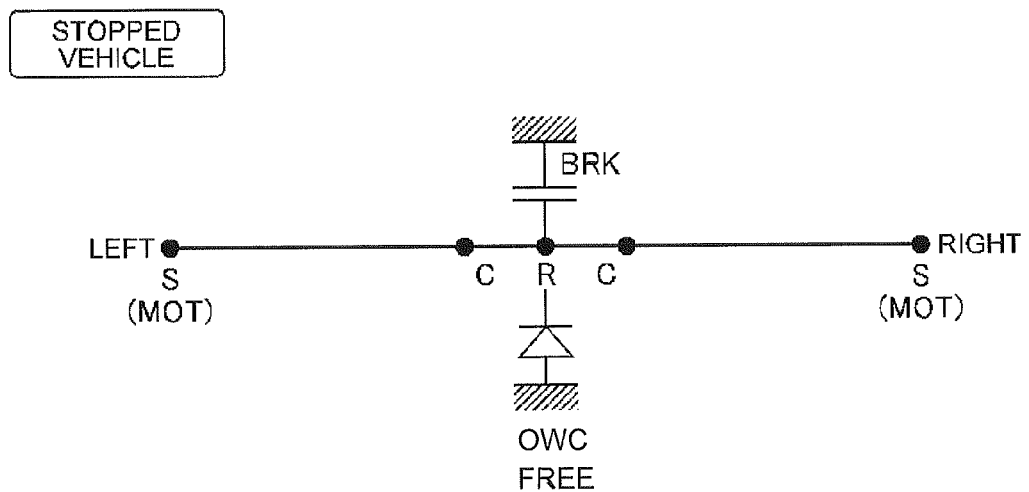
FIG. 4 is a collinear diagram of the running gear shown in FIG. 2 while the vehicle is stopped.

FIG. 4 is a collinear diagram of a vehicle, for example, vehicle 3 (shown in FIG. 1), while vehicle 3 is stopped.

Because the electric motors 2A and 2B (shown in FIG. 1) stop, and the rear wheels RWr and LWr (shown in FIG. 1) are also stopped, there is no torque applied to either element.

Figure 5:
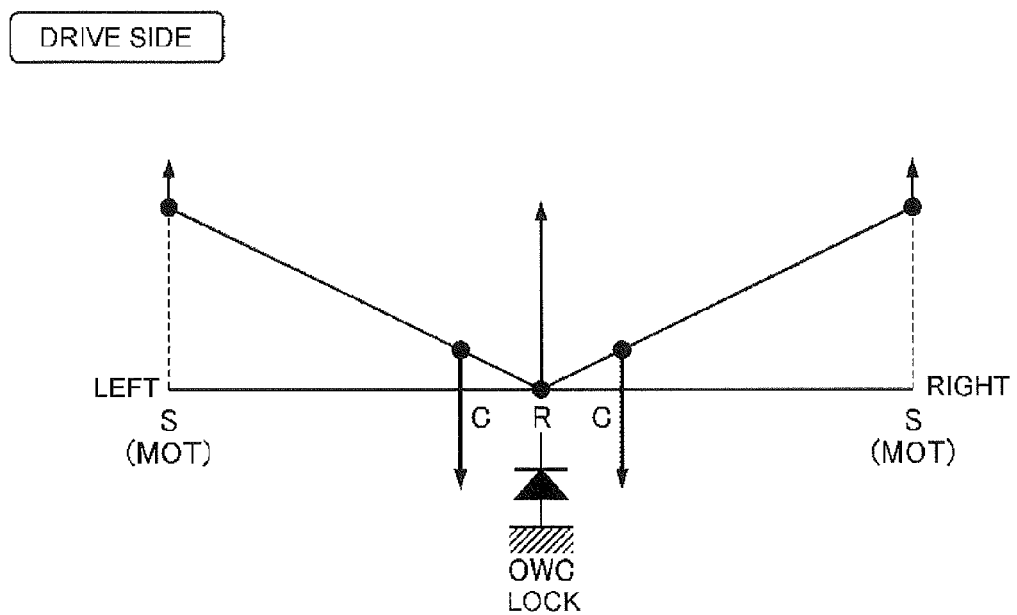
FIG. 5 is a collinear diagram of torque applied to the running gear when the running gear is on the drive side and the vehicle is moving in a forward direction.

FIG. 5 is a collinear diagram of a case where a vehicle, for example, vehicle 3 (shown in FIG. 1), is running forward by the driving force of electric motors 2A and 2B (shown in FIG. 1) of the running gear 1 (shown in FIG. 1), which is to say, a case where the running gear 1 is on the drive side and the vehicle 3 is moving forward.

When driving electric motors 2A and 2B, normal rotational direction torque is added to the sun gears 21A and 21B (shown in FIG. 2). At this time, the ring gears 24A and 24B (shown in FIG. 2), as described above, are locked by the one-way clutch 50 (shown in FIG. 2) and the lock torque in the normal rotational direction is added to the ring gears 24A and 24B that are trying to rotate in the reverse rotational direction. In this manner, the planetary carriers 23A and 23B (shown in FIG. 2) rotate in the normal rotational direction and forward running occurs.

Moreover, running resistance input via the output shafts 10A and 10B (shown in FIG. 2) from the rear wheels RWr and LWr (shown in FIG. 1) acts on the planetary carriers 23A and 23B in the reverse rotational direction. In this manner, when the vehicle is running, increasing the torque of the electric motors 2A and 2B enables the one-way clutch 50 to mechanically engage, thereby locking the ring gears 24A and 24B, and allows the vehicle to start without activating the oil pump 70 (shown in FIG. 1) that activates the hydraulic brakes 60 (shown in FIG. 3). In this manner, the responsiveness of the vehicle at the time of starting can be improved.

Figure 6:
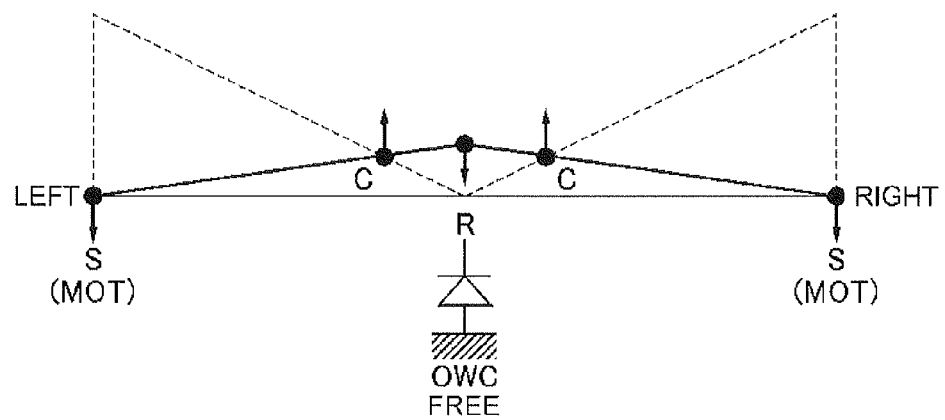
FIG. 6 is a collinear diagram of torque applied to the running gear when the running gear is on the coast side, the vehicle is moving in a forward direction, and the electric motor is stopped.

FIG. 6 is a collinear diagram of a case where a vehicle, for example, vehicle 3 (shown in FIG. 1) is running forward by the drive unit 6 (shown in FIG. 1) or when the vehicle 3 is being towed in the forward direction by another vehicle or the like and the electric motors 2A and 2B (shown in FIG. 1) are stopped, which is to say, a case where the running gear 1 (shown in FIG. 1) is on the coast side and the electric motors 2A and 2B are stopped.

When stopping the electric motors 2A and 2B from the state illustrated in FIG. 5, torque in the normal rotational direction acts on the planetary carriers 23A and 23B (shown in FIG. 2) from the rear wheels RWr and LWr (shown in FIG. 1) that attempt to continue running forward via the output shafts 10A and 10B (shown in FIG. 2), therefore, torque in the reverse rotational direction acts on the ring gears 24A and 24B (shown in FIG. 2), and the one-way clutch 50 (shown in FIG. 2) is released. Accordingly, the ring gears 24A and 24B idle at a speed faster than the planetary carriers 23A and 23B. In this manner, when regenerating at the electric motors 2A and 2B is not required and if the ring gears 24A and 24B are not fixed by the hydraulic brake 60, the electric motors 2A and 2B stop, and co-rotation of the electric motors 2A and 2B can be prevented.

Figure 7:
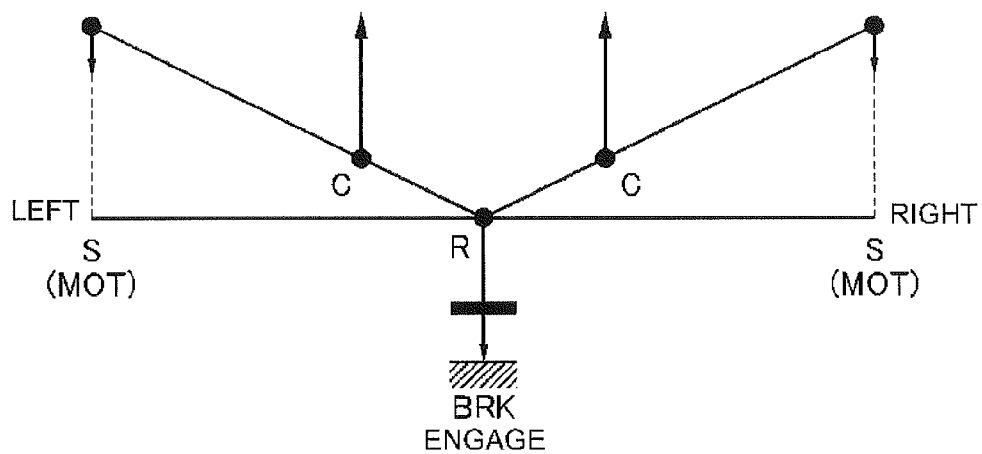
FIG. 7 is a collinear diagram of torque applied to the running gear when the running gear is on the coast side, the vehicle is moving in a forward direction, and the electric motor is regenerating.

FIG. 7 is a collinear diagram of a case where a vehicle, for example, vehicle 3 (shown in FIG. 1) is running forward by the drive unit 6 (shown in FIG. 1) and regeneration occurs in the electric motors 2A and 2B (shown in FIG. 1) in a state where the accelerator is off and the vehicle is experiencing natural deceleration or in a state where deceleration occurs by braking by the brake, which is to say, a case where the running gear 1 (shown in FIG. 1) is on the coast side and the electric motors 2A and 2B are regenerating.

When regenerating the electric motors 2A and 2B from the state illustrated in FIG. 5, torque in the normal rotational direction acts on the planetary carriers 23A and 23B from the rear wheels RWr and LWr that attempt to continue running forward via the output shafts 10A and 10B, therefore, torque in the reverse rotational direction acts on the ring gears 24A and 24B, and the one-way clutch 50 is released. At this time, adding lock torque in the reverse rotational direction to the ring gears 24A and 24B with the engagement of the hydraulic brake 60 allows the ring gears 24A and 24B to be fixed and for regenerative torque in the reverse rotational direction to act on the electric motors 2A and 2B. In this manner, regenerative charging can occur in the electric motors 2A and 213.

Figure 8:
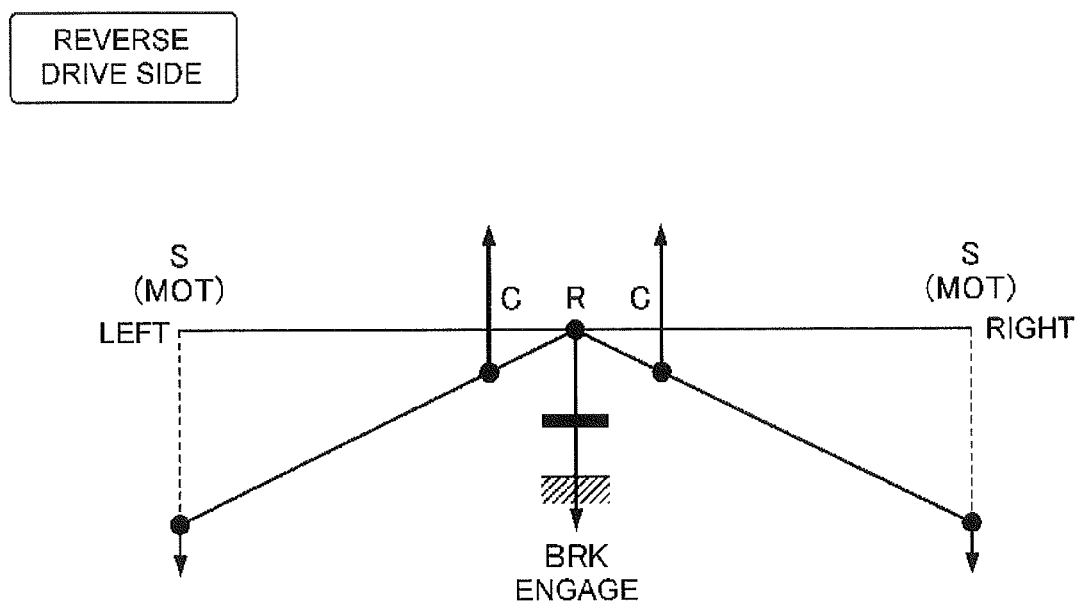
FIG. 8 is a collinear diagram of torque applied to the running gear when the running gear is on the drive side and the vehicle is moving in a reverse direction.

FIG. 8 is a collinear diagram of a case where a vehicle, for example, vehicle 3 (shown in FIG. 1), is running in reverse by the motor torque of the electric motors 2A and 2B (shown in FIG. 1) of the running gear 1 (shown in FIG. 1), which is to say, a case where the running gear 1 is on the drive side moving in reverse.

When driving electric motors 2A and 2B in the reverse rotational direction, reverse rotational direction torque is added to the sun gears 21A and 21B. At this time, although torque in the normal rotational direction acting on the ring gears 24A and 24B in the one-way clutch 50 is released, lock torque in the reverse rotational direction is added to the ring gears 24A and 24B by the engagement of the hydraulic brake 60, therefore the ring gears 24A and 24B are fixed and the planetary carriers 23A and 23B rotate in the reverse rotational direction and running in reverse occurs. Moreover, running resistance input via the output shafts 10A and 10B from the rear wheels RWr and LWr acts on the planetary carriers 23A and 23B in the normal rotational direction.

Figure 9:
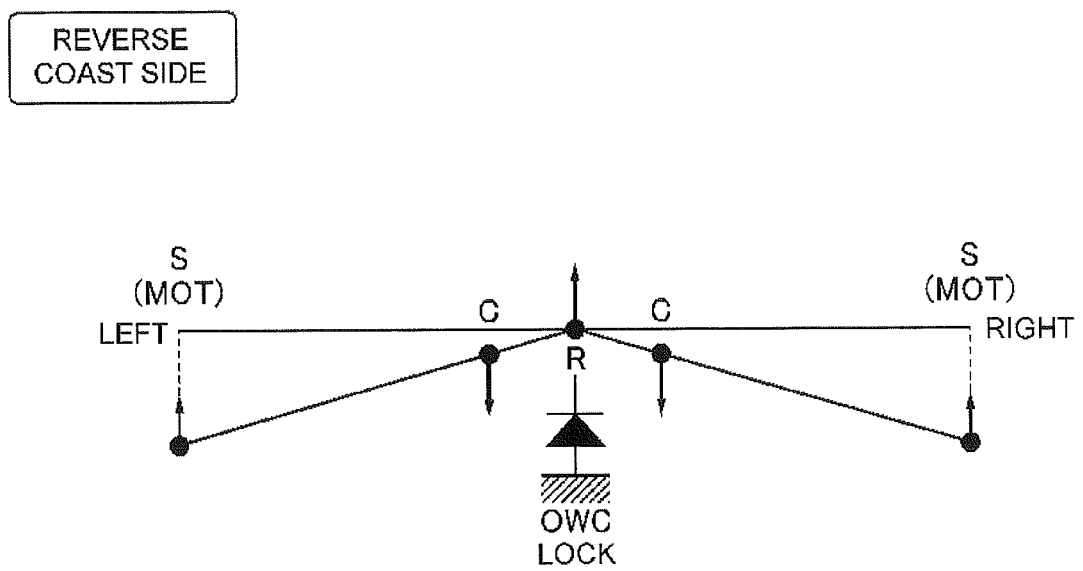
FIG. 9 is a collinear diagram of torque applied to the running gear when the running gear is on the coast side and the vehicle is moving in a reverse direction.

FIG. 9 is a collinear diagram of a case where a vehicle, for example, vehicle 3 (shown in FIG. 1), is running in reverse by the drive unit 6 (shown in FIG. 1) or when the vehicle 3 is being towed in the reverse direction by another vehicle or the like, which is to say, a case where the running gear 1 (shown in FIG. 1) is on the coast side when running in reverse.

At this time, because torque in the reverse rotational direction acts on the planetary carriers 23A and 23B from the rear wheels RWr and LWr that continue to attempt to run in the reverse direction via the output shafts 10A and 10B, the ring gears 24A and 24B are locked by the one-way clutch 50, lock torque in the normal rotational direction is added to the ring gears 24A and 24B that attempt to rotate in the reverse rotational direction, and a reverse electromotive power in the normal rotational direction is generated in electric motors 2A and 2B.

Figure 10:
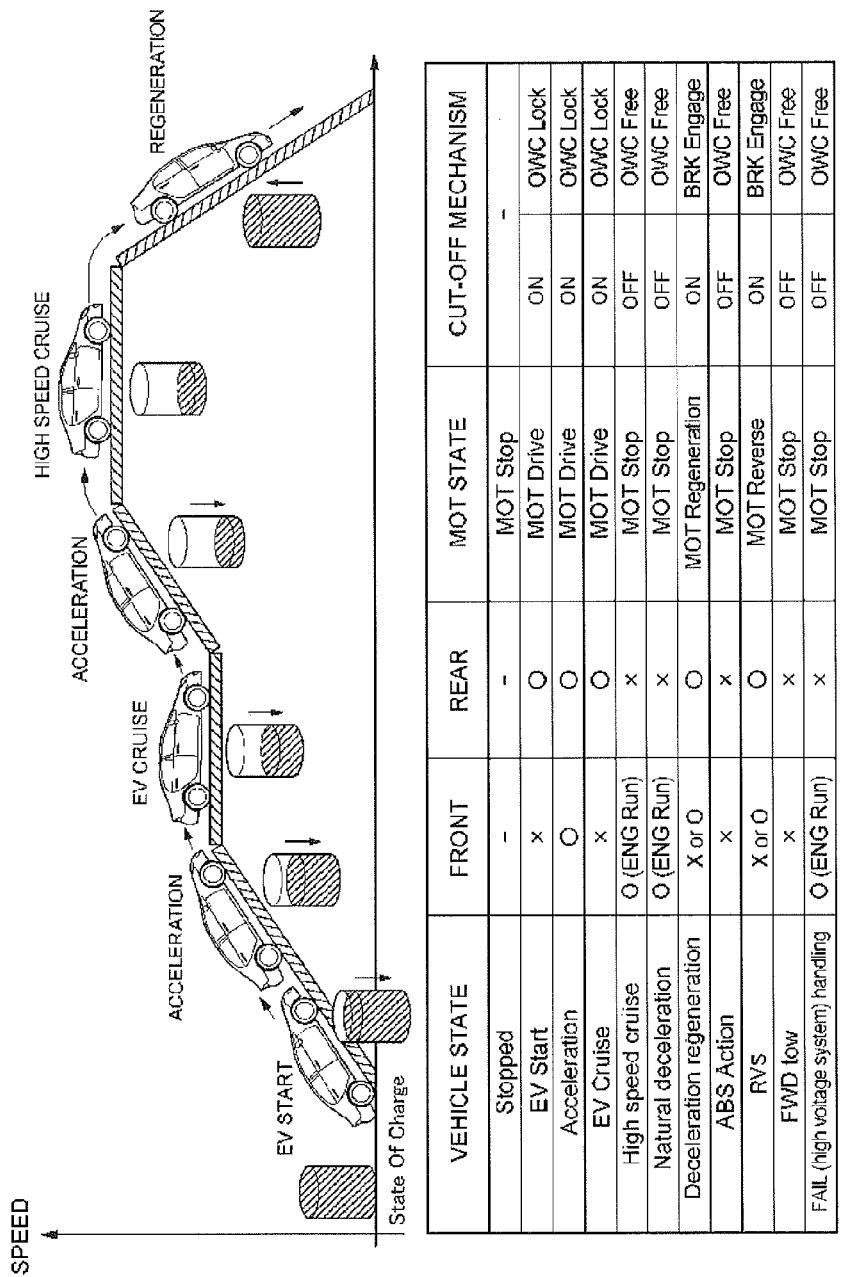
FIG. 10 is a diagram illustrating a state of the electric motor and a state of a cut off mechanism in a running state of the vehicle shown in FIG. 1.

FIG. 10 is a diagram illustrating a state of the electric motors 2A and 2B (shown in FIG. 1) when the vehicle 3 is running and a state of a cut off mechanism (one-way clutch 50 and hydraulic brake 60). Moreover, the term "front" indicates the drive unit 6 (shown in FIG. 1) that drives the front wheels Wf, the term "rear" indicates the running gear 1 (shown in FIG. 1) that drives the rear wheels Wr, O is operation (which includes driving and regenerating), and x is non-operation (stopped). In addition, MOT state means the state of the electric motor 2A and 2B of the running gear 1. Furthermore, the cut off mechanism being ON indicates that the ring gears 24A and 24B (shown in FIG. 2) are locked, while OFF indicates that the ring gears 24A and 24B are in a free state. In addition, OWC means the one-way clutch 50 (shown in FIG. 2), and BRK means the hydraulic brake 60 (shown in FIG. 2).

When stopped, the electric motors 2A and 2B of the running gear 1 stop, both the drive unit 6 of the front wheel Wf side and the running gear 1 of the rear wheel Wr side stop, and the cut off mechanism is also in a non-operational state.

Further, after the key position is turned ON, electric motors 2A and 2B of the running gear 1 of the rear wheels Wr drive in electric vehicle (EV) start. At this time, as explained in FIG. 5, the cut off mechanism is locked by the one-way clutch 50, and motive power of electric motors 2A and 2B is transferred to the rear wheels RWr and LWr. Subsequently, at the time of acceleration, the drive unit 6 of the front wheel Wf side and the running gear 1 of the rear wheel Wr side become four wheel drive, and at this time as well, as explained in FIG. 5, the cut off mechanism is locked by the one-way clutch 50 and the motive power of the electric motors 2A and 2B is transferred to the rear wheels RWr and LWr.

In low and medium speed ranges of EV cruise, because the motor efficiency is good, the drive unit 6 of the front wheel Wf side is in a non-operating state, resulting in rear wheel drive by the running gear 1 of the rear wheel Wr side. Also at this time, as explained in FIG. 5, the cut off mechanism is locked by the one-way clutch 50 and the motive power of the electric motors 2A and 2B is transferred to the rear wheels RWr and LWr.

Meanwhile, because engine efficiency is good in the high speed range for high speed cruising, front wheel drive occurs by the drive unit 6 of the front wheel Wf side. At this time, as explained in FIG. 6, because the one-way clutch 50 of the cut off mechanism is disengaged (OWC free) and the hydraulic brake 60 does not activate, the electric motors 2A and 2B stop.

Further, as explained in FIG. 6, during natural deceleration, because the one-way clutch 50 of the cut off mechanism is disengaged (OWC free) and the hydraulic brake 60 does not activate, the electric motors 2A and 2B stop.

Meanwhile, when regenerating during deceleration, for example, when driving by drive power of the drive unit 6 of the front wheel Wf side, as explained in FIG. 7, the one-way clutch 50 of the cut off mechanism is disengaged (OWC free) and regenerative charging can occur in the electric motors 2A and 2B by the hydraulic brake 60 engaging.

In normal running, the electric motors 2A and 2B collaborate with the braking control of the friction brakes to recover running energy, however, when sudden braking is required (for example, at the time of ABS activation), regeneration of the electric motors 2A and 2B is prohibited and priority is given to braking control through the friction brakes. In this case, the one-way clutch 50 is in a disengaged state (OWC free), and the electric motors 2A and 2B are stopped by not activating the hydraulic brake 60.

When running in reverse, either rear wheel drive is used by stopping the drive unit 6 of the front wheel Wf side and driving the running gear 1 of the rear wheel Wr side, or four wheel drive is used by the drive unit 6 of the front wheel Wf side and the running gear 1 of the rear wheel Wr side. At this time, as explained in FIG. 8, electric motors 2A and 2B rotate in the reverse rotational direction, and the one-way clutch 50 of the cut off mechanism disengages (OWC free), and the motive power of the electric motors 2A and 2B is transferred to the rear wheels RWr and LWr by connecting the hydraulic brake 60.

When being towed in the forward direction side (forward tow), as explained in FIG. 6, because the one-way clutch 50 of the cut off mechanism is disengaged (OWC free) and the hydraulic brake 60 does not activate, the electric motors 2A and 2B stop. Moreover, when being towed forward, the hydraulic brake 60 connects in the same manner as during deceleration regeneration when regenerating at the electric motors 2A and 2B.

In addition, when electric motors 2A and 2B cannot drive due to a failure in the high-voltage system such as a failure or the like of the PDU or the like, front wheel drive occurs by the drive unit 6 of the front wheel Wf side. At this time, as explained in FIG. 6, because the one-way clutch 50 of the cut off mechanism is disengaged (OWC free) and the hydraulic brake 60 does not activate, the electric motors 2A and 2B stop.

An explanation will be given next of a control system of this embodiment that prevents the generation of excess torque in the drive shaft at the time of sudden braking.

Figure 11:
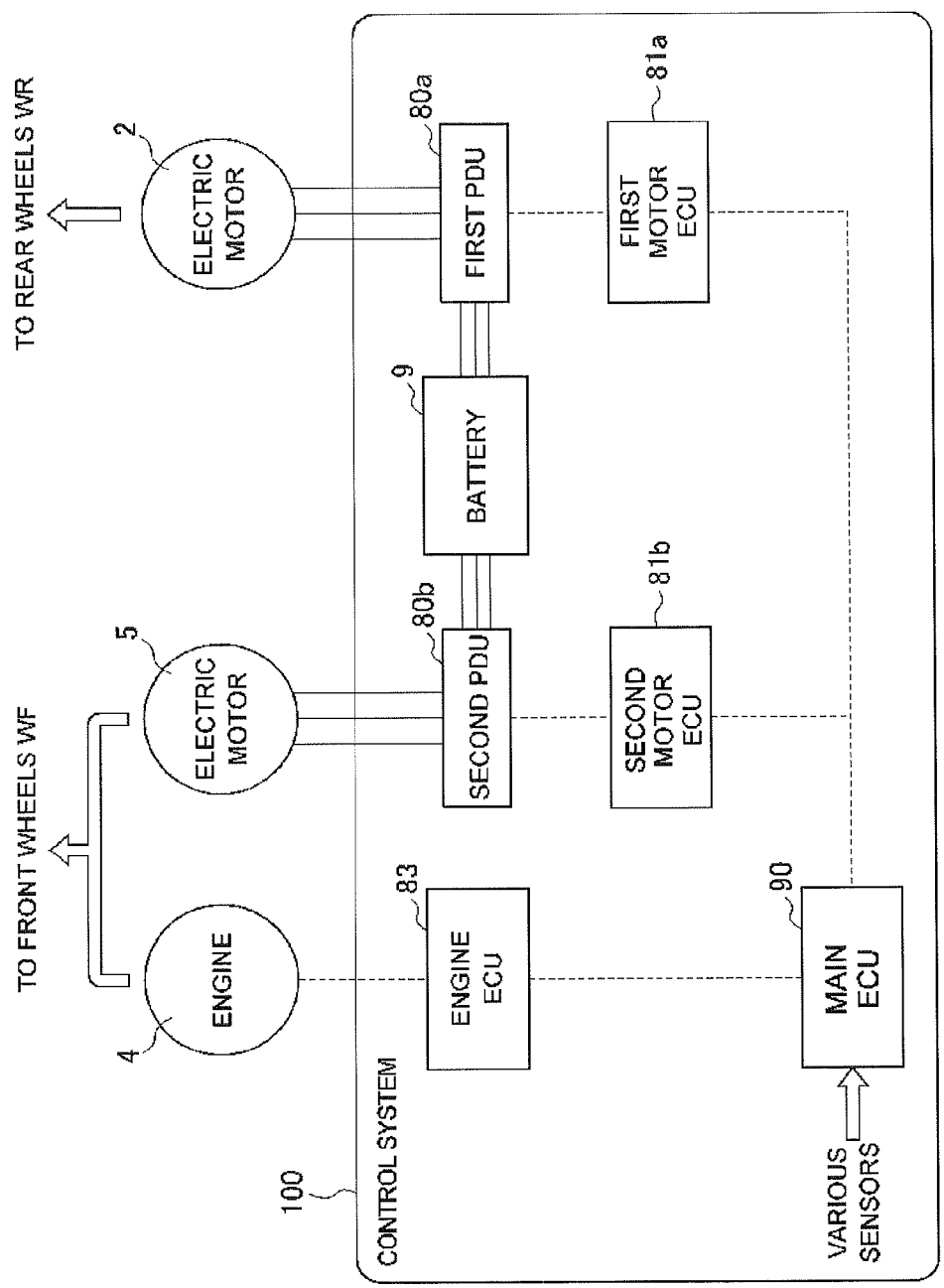
FIG. 11 is a configuration diagram of an exemplary control system included in the vehicle shown in FIG. 1.

FIG. 11 is a configuration diagram of an exemplary embodiment of a control system 100 included within a vehicle, for example, vehicle 3 (shown in FIG. 1). In the exemplary embodiment, a first PDU (power drive unit) 80a is connected to the electric motor 2 for the rear wheels Wr and to a high-voltage battery 9.

The first PDU 80a is equipped with a bridge circuit (not shown in FIG. 11) that bridges a switching element and is provided with a pulse width modulation (PWM) inverter driven by pulse width modulation (PWM). A first motor ECU (electronic control unit) 81a is connected to this first PDU 80a, and the first motor ECU 81a is configured to output a signal having a predetermined pulse width according to control by the first PDU 80*a* based on a torque command value from a main ECU 90 to be described below. The first PDU 80*a*, when the electric motor 2 is driving, is configured to convert direct current power output from the battery 9 to three phase alternating current power that is supplied to the electric motor 2, and when electric motor 2 is regenerating, it converts three phase alternating current power output from the electric motor 5 to direct current power to charge the battery 9.

A second PDU 80*b* is connected to the electric motor 5 of the front wheels Wf. The second PDU 80*b* has a similar configuration to the first PDU 80*a* and is configured such that a second motor ECU 81*b* is connected corresponding to the electric motor 5 for the front wheels Wf so that the control from the second motor ECU 81*b* is received in order to drive and regenerate at the electric motor 5.

An engine ECU 83 is connected to the internal combustion engine 4 that controls the engine by changing the fuel injection amount or the like based on a detection result from, for example, an accelerator pedal sensor or the like.

Moreover, while only a single set configuration (configuration of first PDU 80*a* and first motor ECU 81*a*) is illustrated in the drawing as a control system for the electric motor 2 for the rear wheels Wr, this does not indicate anything beyond economy of description. There are respective configurations of the first PDU 80*a* and the first motor ECU 81*a* corresponding to each electric motor 2A and 2B for the left and right rear wheels RWr and LWr. In addition, these first motor ECUs 81*a* are configured so that different torque command values are sent from the main ECU 90 to each of the left and right rear wheels RWr and LWr.

The main ECU 90 that performs integrated control of the vehicle 3 is connected to the engine ECU 83, the first motor ECU 81*a*, and the second motor ECU 81*b*. The main ECU 90 is configured to monitor various sensors and units installed in the vehicle 3, and the drive amount and the regeneration amount by the internal combustion engine 4 and electric motors 2 and 5 are determined according to such monitored condition. The main ECU 90 is configured to output control commands to the engine ECU 83, the first motor ECU 81*a*, and the second motor ECU 81*b*. Further, the main ECU 90 is configured to prevent generation of excess torque to the drive shaft at the time of sudden braking.

Figure 12:
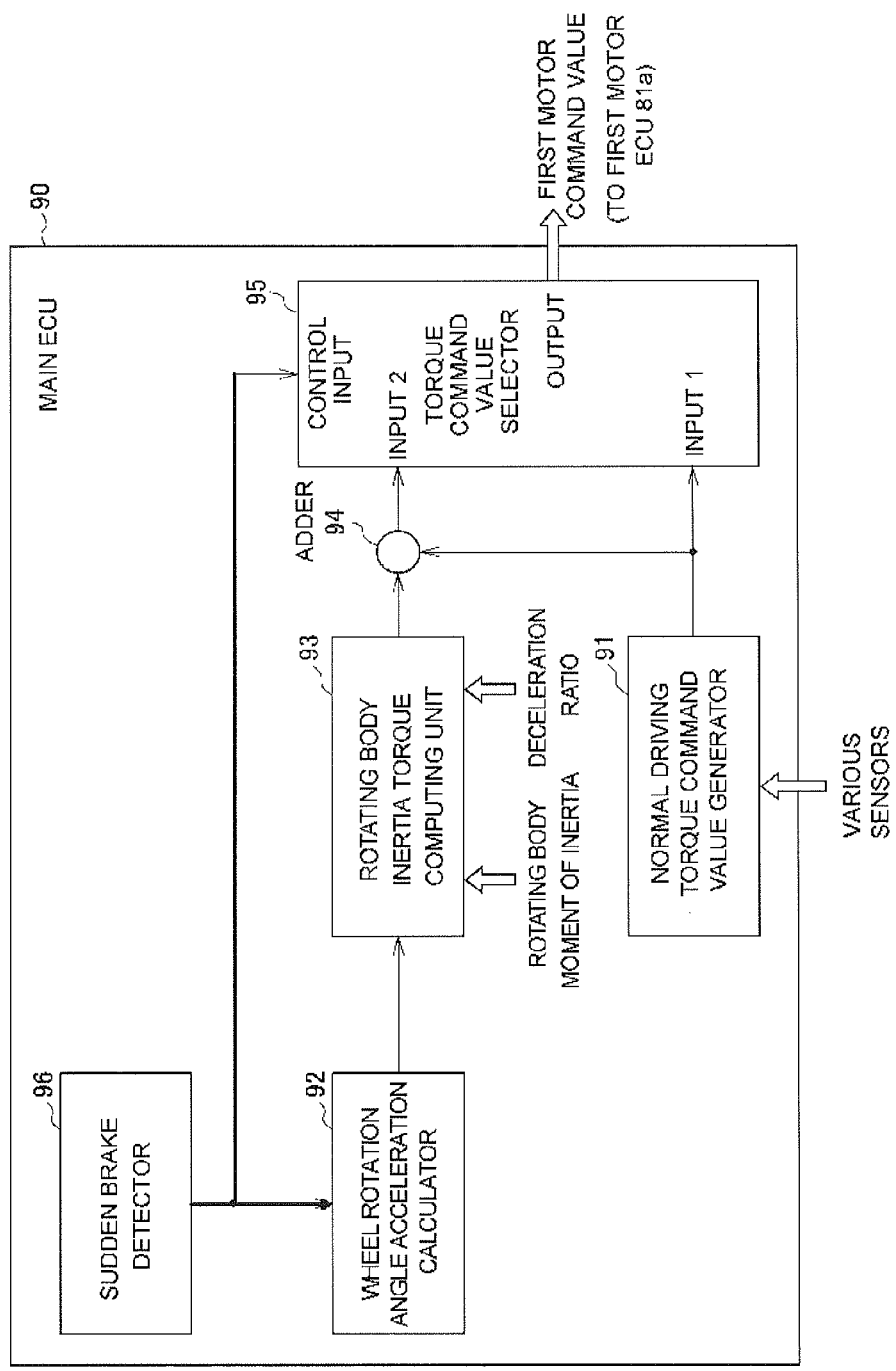
FIG. 12 is a system diagram of an exemplary main electronic control unit (ECU) that may be included in the control system shown in FIG. 11.

FIG. 12 is a system diagram of an exemplary embodiment of main ECU 90 (shown in FIG. 11). In the exemplary embodiment, the main ECU 90 includes a normal running torque command value generator 91, a wheel rotation angular acceleration calculator 92, a rotating body inertia torque computing unit 93, an adder 94, a torque command value selector 95, and a sudden brake detector 96, and is configured to output a first motor command value to the first motor ECU 81*a* for PWM control of the electric motor 2.

Moreover, in FIG. 12, while only a single configuration is illustrated as the configuration for the rear wheels Wr, this does not indicate anything beyond economy of description. The main ECU 90 includes a configuration that corresponds to the left and right rear wheels RWr and LWr, and such configuration is similar to that illustrated in FIG. 12 unless otherwise specifically described.

The normal running torque command value generator 91 is configured to generate a torque command value given to the electric motor 2 when the hybrid vehicle 3 is running normally. This torque command value is a torque command value for the normal running control described above and is determined in compliance with the vehicle control, according to operation by the driver, from the perspective of overall fuel consumption improvement of the vehicle and from the perspective of improving ride quality for the driver.

As was described previously using FIGS. 4 through 11, the vehicle 3, as a hybrid vehicle, can achieve various states such as stop, EV start, acceleration, EV cruise, high speed cruise, natural deceleration, deceleration regeneration, and the like. Therefore, the normal running torque command value generator 91 generates torque command values according to these vehicle states.

In addition, the vehicle 3 includes various sensors (not shown in the drawings) that detect vehicle information for normal running control, and therefore, the normal running torque command value generator 91 generates torque command values according to output from these sensors. Examples of various sensors that detect vehicle information may include any one or combination of two or more of a speed sensor that detects the speed the vehicle itself, a brake pedal sensor that detects a pressing operation and operation amount of a brake pedal by a driver, an accelerator pedal angle sensor that detects a pressing operation amount of an accelerator pedal by a driver, a pedal torque sensor that detects the torque applied to each pedal, a shift position sensor, and the like.

The torque command value generated by the normal running torque command value generator 91 is configured to be output to the adder 94 with input 1 of the torque command value selector 95 to be described below.

The wheel rotation angular acceleration calculator 92 is configured to calculate the rotation angular acceleration of the rear wheels Wr when it is detected that the driver has pressed the brakes suddenly.

In order to calculate the rotation angular acceleration of the rear wheels Wr, a sensor is provided, for example, a rotational speed sensor, in the rear wheels Wr that monitors the state of rotation thereof, and by inputting the output of this rotational speed sensor into the wheel rotation angular acceleration calculator 92, the wheel rotation angular acceleration calculator 92 is made to calculate the wheel rotation angular acceleration based on the amount of time change in the rotational speed of the rear wheels Wr.

Determination of whether the driver has pressed the brakes suddenly is based on the output from the sudden brake detector 96. Further, the calculation result of the wheel rotation angular acceleration calculator 92 is configured to be output to a rotating body inertia torque computing unit 93.

The rotating body inertia torque computing unit 93 uses the calculation result from the wheel rotation angular acceleration calculator 92 to calculate the inertia torque of a rotating body that resides in a span behind the rear wheels Wr, among members that rotate by the driving force of the electric motor 2, and is configured to output a torque command value sufficient to cancel this inertia torque.

In order to calculate the inertia torque of the rotating body, an moment of inertia of the rotating body is multiplied by the rotation angular acceleration of the rear wheels of Wr from the wheel rotation angular acceleration calculator 92, and this multiplied value is converted to the motor axis according to a reduction ratio of the planetary gear type speed reducer 12.

Here, an explanation will be given of members included in the rotating body that is the subject of calculation of inertia torque.

First, the rotating body includes a rotor 15 of the electric motor 2.

Next, the planetary gear type speed reducer 12 is included, as a member that resides in the span behind the rear wheels Wr, among members that rotate by the driving force of the electric motor 2. The planetary gear type speed reducer 12, as described above, is configured with a sun gear 21, a plurality of planetary gears 22, a planetary carrier 23, and a ring gear 24, and because the ring gear 24 is locked, the sun gear 21, the plurality of planetary gears 22, and the planetary carrier 23 are included in the rotating body when the vehicle 3 is running forward by the driving power of the electric motor 2.

Figure 18A:
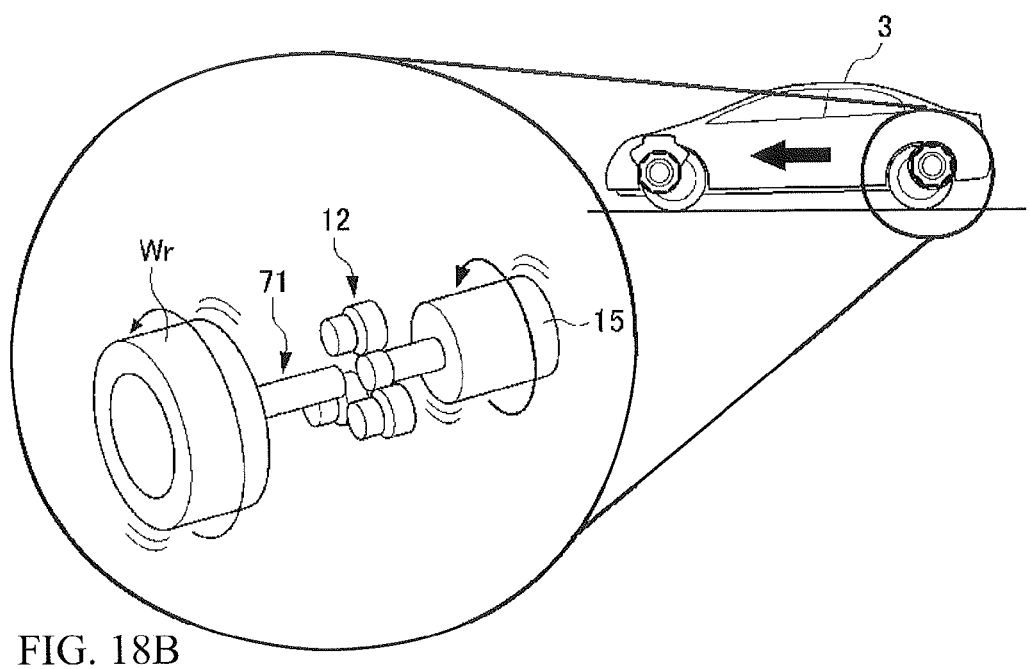
FIG. 18A is an expanded view of a vehicle running gear and wheel.
Figure 18B:
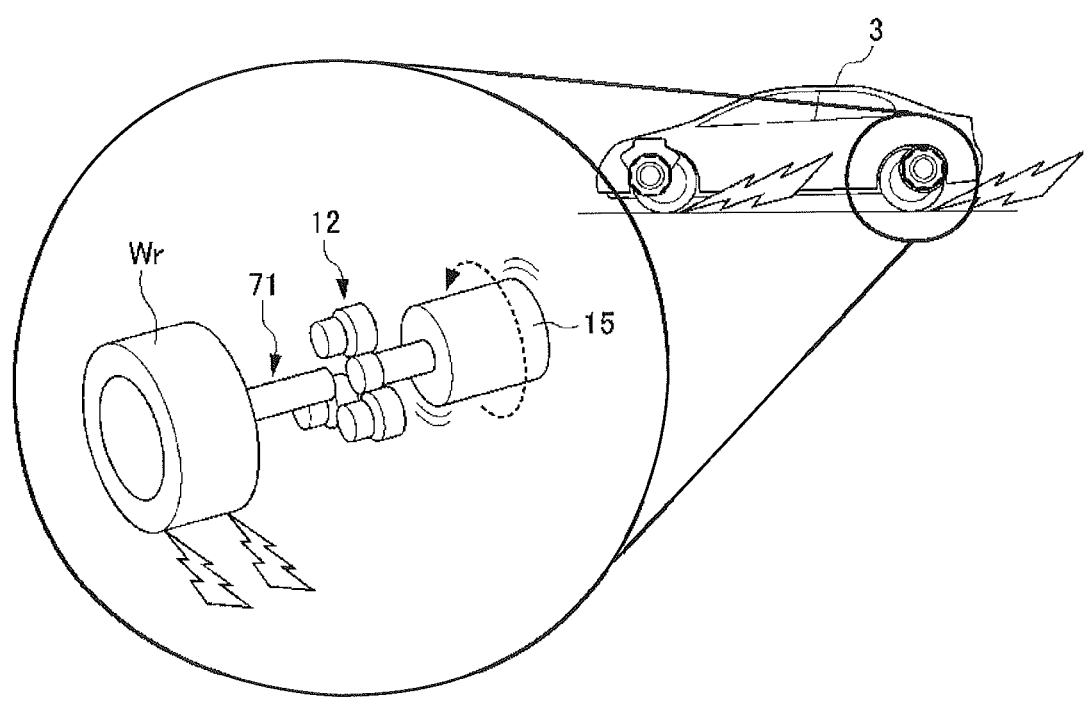
FIG. 18B shows the vehicle running gear and wheel shown in FIG. 18A in a situation where torsional torque is generated in a drive shaft at the time of sudden braking.
Figure 19:
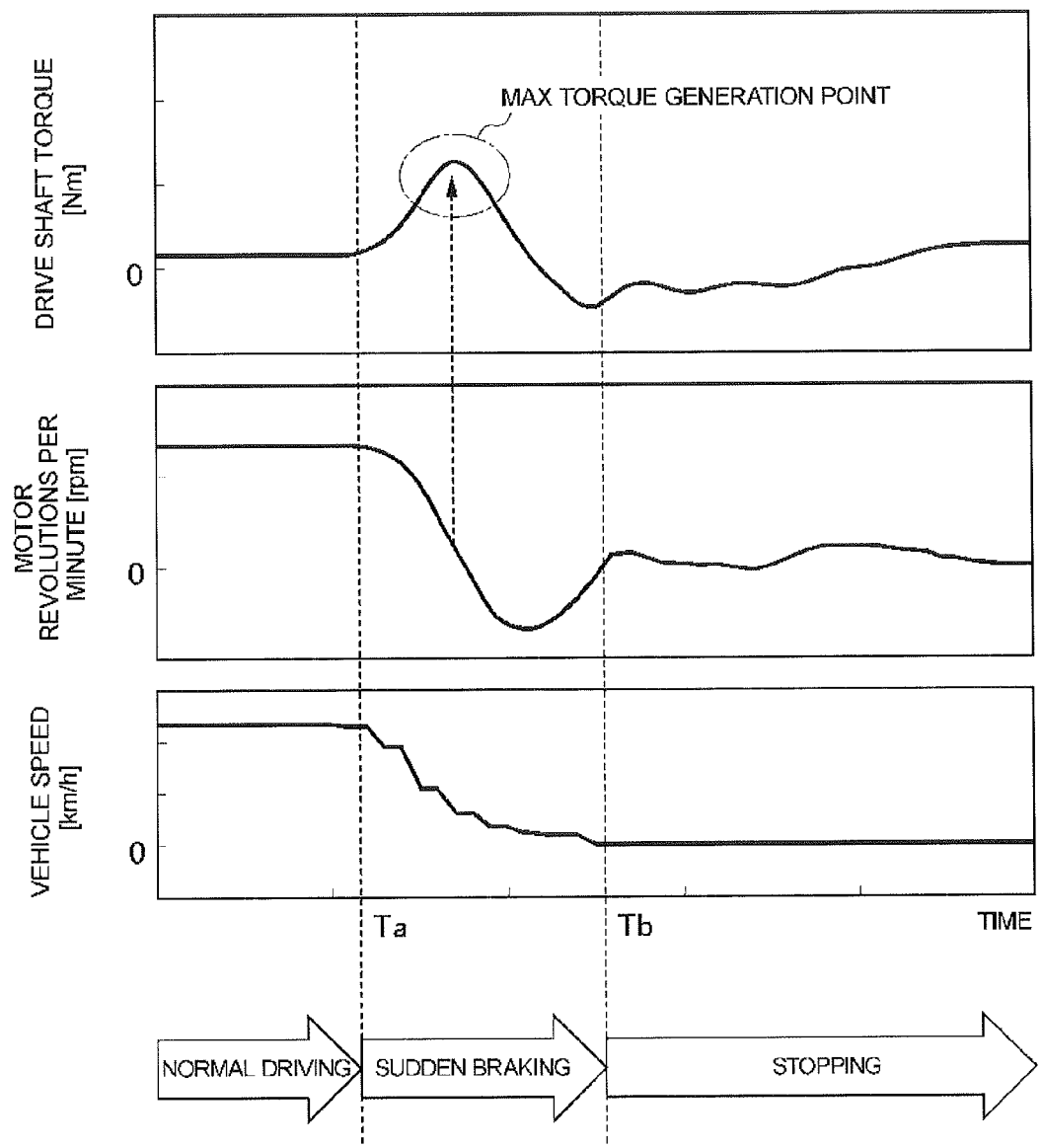
FIG. 19 is a diagram illustrating the mechanism that generates excess torque on the drive shaft at the time of sudden braking.

In addition, a drive shaft 71 (shown in FIG. 18A) may be included as a portion of the rotating body. As explained above, excess torque generated in the drive shaft 71 may concentrate in the connecting portion between the output shaft of the planetary gear type speed reducer 12 and the drive shaft 71, and in the connecting portion between the drive shaft 71 and the axle of the rear wheels Wr. When considering that the rotating body inertia torque calculation is performed to prevent excess torque generation in the drive shaft 71, in order to improve calculation accuracy, members that are positioned before a point, as seen from the electric motor 2, where the excess torque is generated, are chosen from among the members that rotate by the driving force of the electric motor 2 to be included as a portion of the rotating body for purposes of calculating the inertia torque. Accordingly, the drive shaft 71 as a whole may be included in the elements of the rotating body, for example, in cases where excess torque is easily generated in the connecting portion between the axle of the rear wheels Wr and the drive shaft 71. Locations where excess torque concentrates in the drive shaft 71 can be determined through testing and experimenting. However, in the event that locations where this type of excess torque concentrates cannot be identified, or a precise calculation to that extent is not required, a determination of whether to include the drive shaft 71 in the rotating body or not, or a determination of whether to include only that portion closer to the electric motor 2 side than to a midpoint in the length direction of the drive shaft 71, may be suitably decided.

Furthermore, in addition to that described above, small members such as bearings that reside before the point where excess torque is generated, when viewed from the electric motor 2, may also be included in the rotating body, from among the members that rotate by the driving force of the electric motor 2. However, the moment of inertia of these members is relatively small in relation to the moment of inertia of the rotor 15 and the planetary gear type speed reducer 12, therefore, if the calculation does not require that level of precision, these may be excluded from the rotating body.

Moreover, the moment of inertia of the rotating body that includes the rotor 15 described above is normally already known when designing the vehicle 3, therefore this value may be used by storing in advance in a ROM or the like (not illustrated). Further, because the reduction ratio of the planetary gear type speed reducer 12 used in the motor shaft conversion is also already known, this may also be used by storing in advance in the ROM or the like in a similar manner.

The torque command value from this rotating body inertia torque computing unit 93 is configured to be output to the adder 94.

The adder 94 is configured to add the torque command value from the rotating body inertia torque computing unit 93 to the torque command value from the normal running torque command value generator 91. In this manner, the required torque for canceling the inertia torque of the rotating body is added to the torque value for normal running control.

The adder 94 is configured to output the addition result to an input 2 of the torque command value selector 95.

The torque command value selector 95 has two inputs 1 and 2 and a control input. Output from the normal running torque command value generator 91 and output of the adder 94 are respectively received by the inputs 1 and 2, and the output of the sudden brake detector 96 is configured to be received by the control input. The torque command value selector 95 is configured to output either of the inputs 1 or 2 according to a signal given to the command input. When output from the sudden brake detector 96 indicates that the driver has pressed the brakes suddenly, the torque command value from input 2 is output, and when that is not the case, the torque command value from input 1 is made to be output.

The output of the torque command value selector 95 is configured to output to the first motor ECU 81a of FIG. 11 as an output signal (first motor command value) from the main ECU 90.

The sudden brake detector 96 detects whether the driver has pressed the brakes suddenly when the vehicle 3 is running forward by the driving force of the electric motor 2.

Here, the phrase "when the vehicle 3 is running forward by the driving force of the electric motor 2" refers to EV start, acceleration, or EV cruise from among the vehicle states described in FIG. 10.

The determination as to whether or not the driver has pressed the brakes suddenly may be made by, for example, determining whether the speed at which the pressing force of the brake pedal changes exceeds a predetermined value. Specifically, as described above, this may be determined based on the output of a brake pedal sensor that detects the operation and operation amount of pressing a brake pedal by a driver or a pedal torque sensor that detects the torque applied to a pedal.

Moreover, the rear wheels Wr locking due to sudden braking as described above also includes cases in which the rear wheels Wr lock for other reasons or when a similar situation to this occurs. Therefore, the sudden brake detector 96 may detect when an antilock brake system (ABS) activates on the rear wheels Wr when brakes are pressed on a low coefficient of friction ($\mu$) road or when a side brake or parking brake is activated while running. Further, a configuration may be provided to detect any of the above in combination. The determination as to whether the ABS has activated may be made by receiving output from a known ABS control device provided separately. For the determination of a sudden side brake operation, a sensor may be used that detects an operation and operation amount of a side brake by a driver, or a sensor that detects torque applied to the side brake, to detect that a side brake has been operated by a force that is not less than a predetermined amount. To determination that a parking brake has been operated, detection can be made of whether or not the side brake has been operated by the driver. In either case, a simple configuration can be adopted because an existing sensor output or the like may be used.

Further, the sudden brake detector 96 is configured to output the detection result thereof to the wheel rotation angular acceleration calculator 92 and to the torque command value selector 95 described above.

A description is given next of a control flow in such configuration that prevents the generation of excess torque on the drive shaft at the time of a sudden brake.

Figure 13:
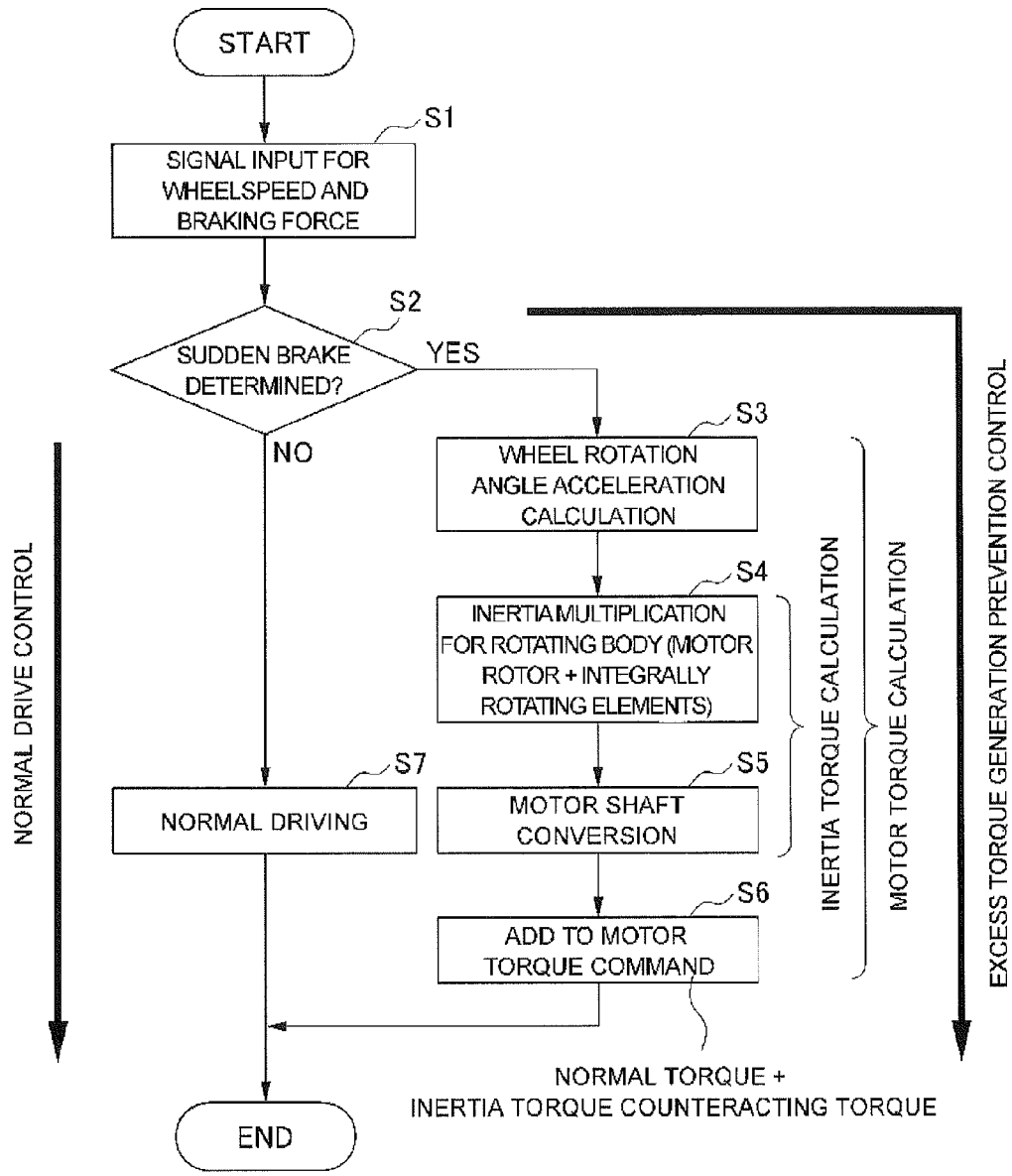
FIG. 13 is a flow chart of an exemplary method of controlling the vehicle shown in FIG. 1.

FIG. 13 is a flow chart of an exemplary method of controlling a vehicle, for example, the vehicle 3 (shown in FIG. 1).

In the exemplary embodiment, in step S1, the vehicle 3 is running forward by the electric motor 2 (shown in FIG. 1), and the electric motor 2 is under normal running control. The torque command value for normal running control is generated by the normal running torque command value generator 91 (shown in FIG. 12) of the main ECU 90 (shown in FIG. 12). The normal running torque command is output to the first motor ECU 81a (shown in FIG. 11) as the first motor command value, and the electric motor 2 is controlled.

As used herein, the phrase "when the vehicle 3 is running forward by the driving force of the electric motor 2" refers to EV start, acceleration, and EV cruise from among the vehicle states described in FIG. 10.

In step S2, it is determined whether the driver has pressed the brakes suddenly. In the exemplary embodiment, this determination is performed by the sudden brake detector 96 (shown in FIG. 12).

When it is determined in step S2 that the driver has pressed the brakes suddenly, it is determined that the rear wheels Wr are attempting to lock and excess torque generation prevention control is performed in step S3 and beyond. At this time, the torque command value selector 95 (shown in FIG. 12) is controlled to output the addition result from the adder 94 (shown in FIG. 12) as the first motor command value.

In step S3, the rotation angular acceleration of the rear wheels Wr is calculated. This calculation is performed by the wheel rotation angular acceleration calculator 92 (shown in FIG. 12).

In step S4, the moment of inertia of the rotating body is multiplied for the rotation angular acceleration of the rear wheels Wr calculated in step S3. The rotating body mentioned here is the same as that described above and refers to the rotating body that resides in a span behind the rear wheels Wr, among members that rotate by the driving force of the electric motor 2. In addition, in step S5, the multiplication result of step S4 undergoes motor shaft conversion according to the reduction ratio of the planetary gear type speed reducer 12. Because the inertia torque of the rotating body is completed by computing in this manner, a torque command value sufficient to cancel this inertia torque is generated. In the exemplary embodiment, the computations in steps S4 and S5 are performed at the rotating body inertia torque computing unit 93 (shown in FIG. 12).

By performing the control described above in steps S3 to S5, the main ECU 90 computes the inertia torque of the rotating body that includes the rotor 15 using the rotational state of the rear wheels Wr in a case where the brakes are pressed suddenly, thereby, a torque command value sufficient to cancel this inertia torque is generated.

In step S6, the torque command value generated in step S5 is added, for example, by the adder 94, to the torque command value for normal running control. The torque command value for normal running control generated at the normal running torque command value generator 91 is used.

Furthermore, because the addition result from the adder 94 is output from the torque command value selector 95 as the motor command value, control of the electric motor 2 is performed based on this command value.

Meanwhile, when it is determined in step S2 that the driver has not pressed the brakes suddenly, the process proceeds to step S7. In step S7, the torque command value of the normal running torque command value generator 91 is used to perform normal running control. In this case, the torque command value selector 95 outputs the output from the normal running torque command value generator 91 as the first motor command value, and control of the electric motor 2 is performed based on this command value.

Figure 14:
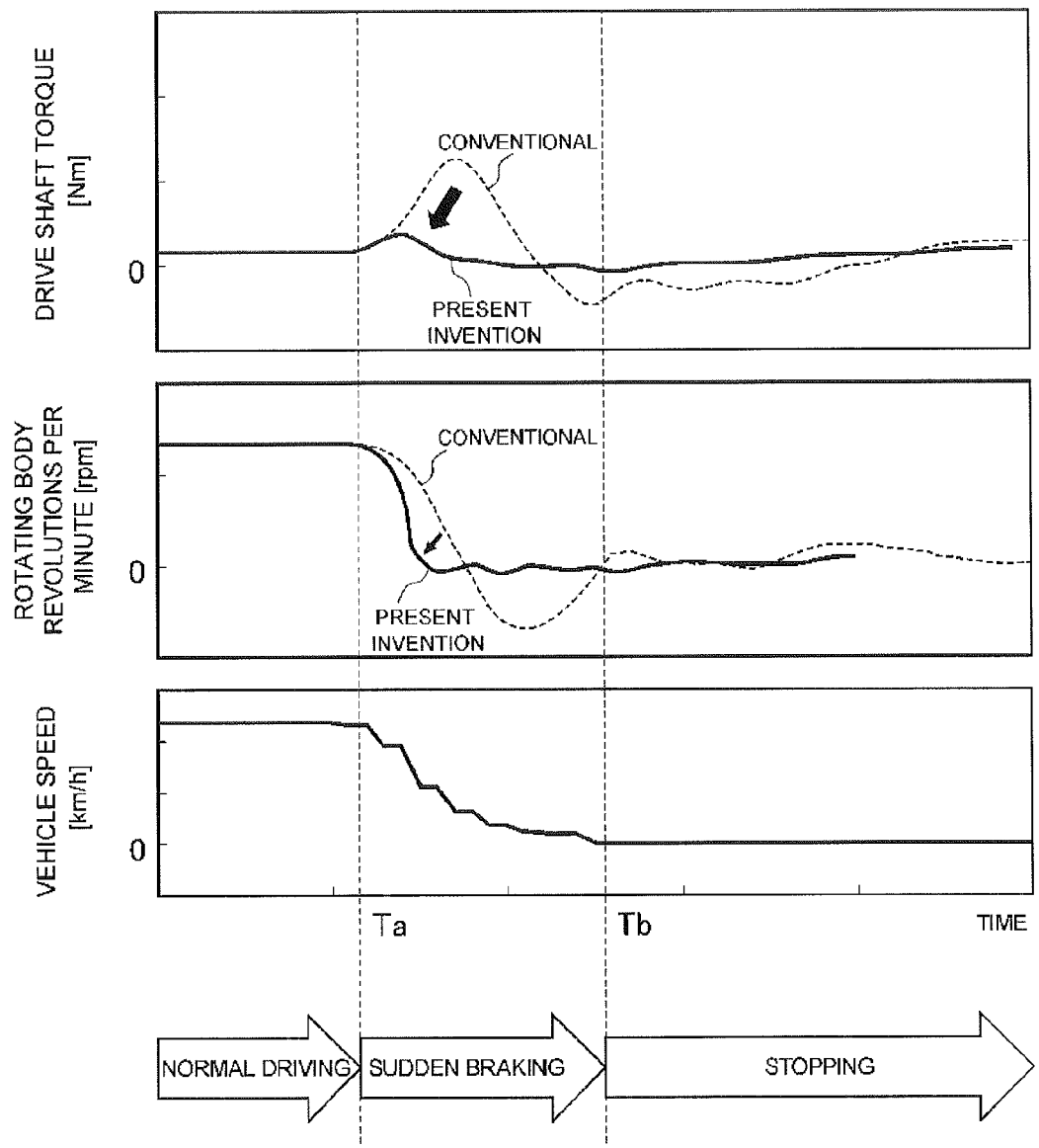
FIG. 14 is a diagram illustrating drive shaft torque and rotating body rotational speed over time during normal driving, sudden braking, and stopping.

FIG. 14 is a diagram illustrating an example of drive shaft torque on a drive shaft, for example, drive shaft 71 (shown in FIG. 18A), included in a vehicle that includes main ECU 90 (shown in FIG. 12) operated in accordance with the method of FIG. 13. More specifically, a graph illustrated by a solid line represents results using the control system shown in FIG. 12, and a dotted line represents that of a conventional example.

Using the control system of this embodiment, even if the rear wheels Wr of the vehicle 3 are locked by a driver pressing the brakes suddenly at a time Ta, through the operation of the main ECU 90 that has detected the sudden brake operation, a torque command value sufficient to cancel the inertia torque of the rotating body that includes the rotor 15 is added to the torque command value for normal running control, and this is used in torque control of the electric motor 2. Therefore, because a regenerative force stronger than that at the time of normal running control is generated in the electric motor 2, the rotational speed of the rotating body that includes the rotor 15 sharply drops. Accordingly, excess torque is also not generated in the drive shaft 71.

Moreover, as illustrated in FIG. 14, after the time Ta, a small amount of torque may be generated on the drive shaft 71. This is due to delay from determination in the main ECU 90 of sudden brake detection or due to a response delay for various computations. The inertia torque of the rotating body canceled through this control is not the same as the inertia torque of the rotating body generated after sudden braking if this control is not performed, however the time of the response delay is extremely short, therefore the two are essentially equivalent and the residual inertia torque of the rotating body does not generate excess torque.

As described above, conventionally, when the vehicle 3 is running forward by the driving force of the electric motor 2, if the driver presses the brakes suddenly and the rear wheels Wr lock, torque of a portion equivalent to the inertia torque of the rotating body that includes the rotor 15 is transferred to the output shaft of the planetary gear type speed reducer 12 and excess torque is generated on the drive shaft 71.

Contrary to this, in the exemplary embodiment, when it is detected that the driver has pressed the brakes suddenly, excess torque generation prevention control is performed from step S3 and beyond, and torque of a portion equivalent to the inertia torque of the rotating body that includes the rotor 15 is added to the torque for normal running control to control the electric motor 2 using the addition result thereof. Accordingly, a strong regenerative force is generated in the electric motor 2, and in this manner, torque of a portion equivalent to the inertia torque of the rotating body that includes the rotor 15 can be canceled. Therefore, the inertia torque of the rotating body that includes the rotor 15 is not transferred to the drive shaft 71 via the planetary gear type speed reducer 12 and thus the generation of excess torque on the drive shaft 71 is prevented.

In this manner, increases in the weight and dimensions of components such as the drive shaft 71 can be prevented, thereby improving fuel consumption and facilitating layout.

Figure 15:
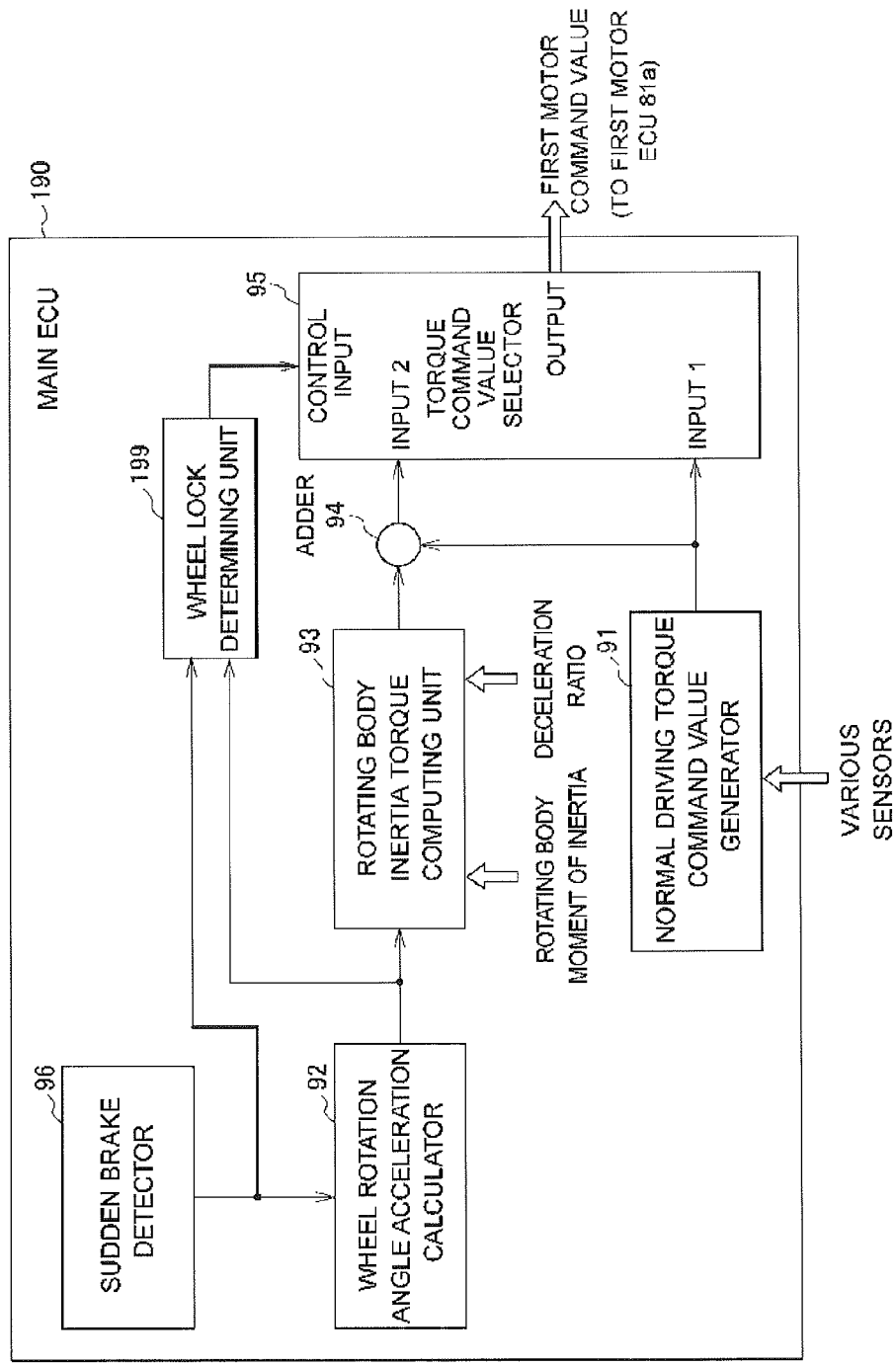
FIG. 15 is a system diagram of a first alternative embodiment of a main ECU that may be included in the control system shown in FIG. 11.

FIG. 15 is a system diagram of a main ECU 190, which is a first alternative embodiment of the main ECU 90 (shown in FIG. 12). Components shared between main ECU 90 and main ECU 190 are identified with like reference numerals. In the first alternative embodiment, the main ECU 190 smoothly controls the control input of the torque command value selector 95 dependent upon whether the rear wheels Wr appear as if they are actually going to lock.

In the exemplary embodiment (i.e., main ECU 90), a driver pressing the brakes suddenly and the locking of the rear wheels Wr are treated as equivalent events, however in actuality they may not be so. Even if a sudden brake detection is made by the torque command value selector 95, the rear wheels Wr may conceivably not lock if there is sufficiently high friction between the rear wheels Wr and the road surface, and conversely, the case is also conceivable, such as when running on a low μ road, where even though the brakes are pressed and the rear wheels Wr are already locked, a sudden brake is not detected by the torque command value selector 95.

Further, although these events may be addressed conceivably, for example, by raising the sensitivity of the sudden brake detection, in this case, excess torque generation prevention control will be performed from step S3 and beyond of FIG. 13, even though the rear wheels Wr are not actually locked. Because excess torque generation prevention control is performed to control the electric motor 2 from the perspective of preventing the generation of excess torque on the drive shaft 71, this may not always be considered appropriate from the perspective of improving fuel consumption for the vehicle overall and from the perspective of improving ride quality of the driver. Accordingly, unnecessarily performing excess torque generation prevention control may be problematic from the perspectives of fuel consumption improvement and ride quality improvement.

Meanwhile, lowering sensitivity of sudden brake detection may also be considered, however, in this case, this may result in performance excess torque generation prevention control not being possible even when the rear wheels Wr are locked, thereby generating a similar problem to that of conventional vehicles. The first alternative embodiment (i.e., main ECU 190) addresses these issues.

In the first alternative embodiment shown in FIG. 15, a wheel lock determining unit 199 receives the output of the sudden brake detector 96 and the output from the wheel rotation angular acceleration calculator 92, and when it is detected that the driver has pressed the brakes suddenly, the wheel lock determining unit 199 is made to determine whether the rear wheels Wr are actually attempting to lock by observing the wheel rotation angular acceleration of the rear wheels Wr. For example, if the rotation angular acceleration of the rear wheels Wr when the brake is pressed during forward running is greater than a predetermined value, a determination can be made from the perspective of fuel consumption improvement of the overall vehicle or from the perspective of ride quality improvement of the driver that control relative to the rear wheels Wr is not being performed, and therefore, a determination can be made that the rear wheels Wr are attempting to lock.

Therefore, the wheel lock determining unit 199 is configured to determine whether the rotation angular acceleration of the rear wheels Wr is greater than a predetermined value, and based on this determination result, is configured to determine whether the rear wheels Wr are actually attempting to lock. The determination result of the wheel lock determining unit 199 is given to the control input of the torque command value selector 95 in addition to the detection result of the sudden brake detector 96 of the first embodiment.

Moreover, the determining method by the wheel lock determining unit 199 is not limited to this. For example, a determination may be made as to whether the rotation angular acceleration of the rear wheels Wr has suddenly changed. In this case, the time change amount (second order differentiation of the rotation angular acceleration) of the rotation angular acceleration is calculated and it is determined whether the value thereof exceeds a predetermined value.

A description is given next of a control flow in such configuration that prevents the generation of excess torque on the drive shaft at the time of a sudden brake.

Figure 16:
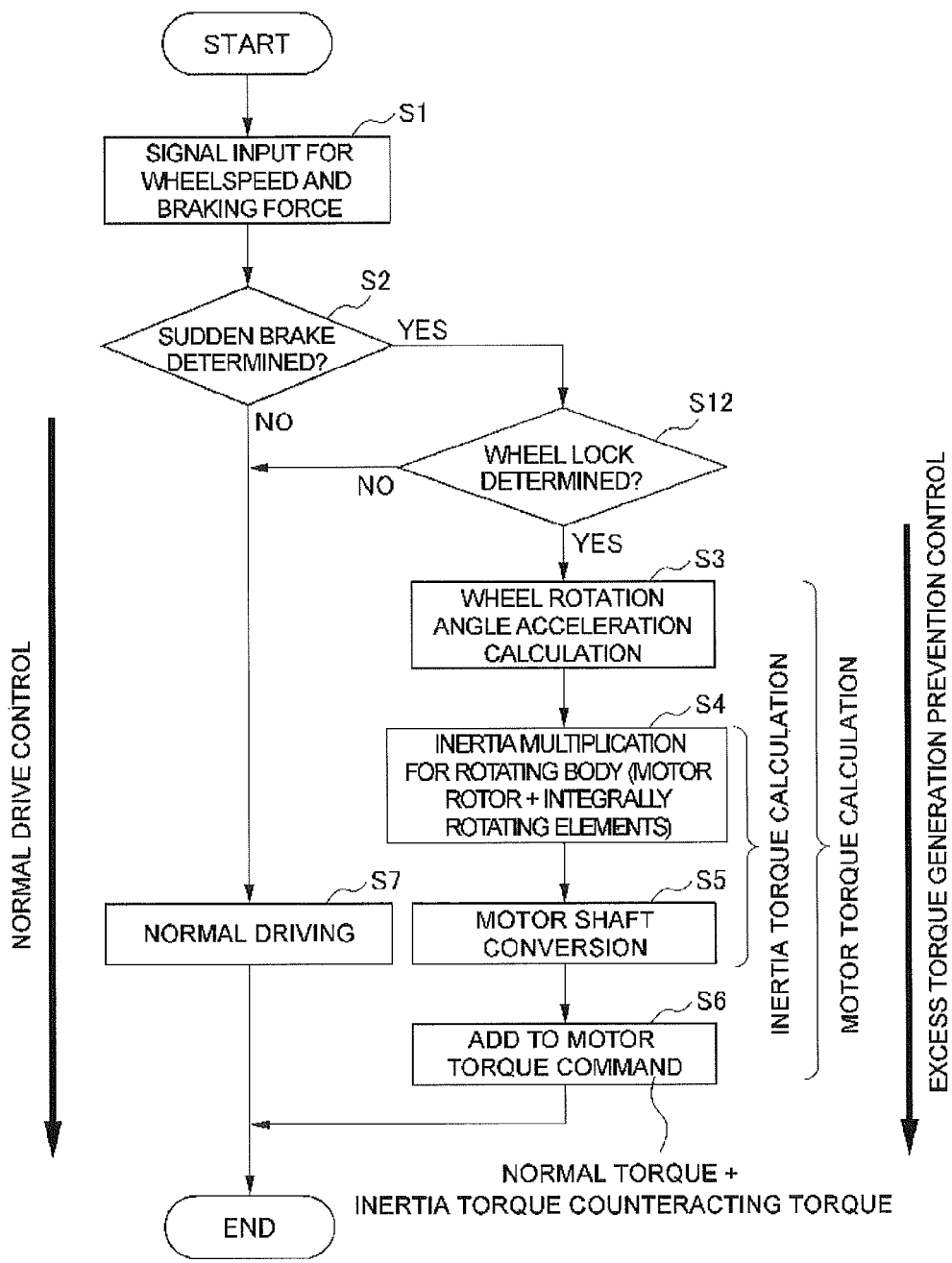
FIG. 16 is a flow chart of an alternative method of controlling the vehicle shown in FIG. 1.

FIG. 16 is a flow chart of an alternative embodiment of a method of controlling a vehicle, for example, vehicle 3 (shown in FIG. 1). The alternative method shown in FIG. 16 is similar to the exemplary method shown in FIG. 13 other than step S12 being provided between steps S2 and S3 of the exemplary method.

When it is determined in step S2 that the driver has pressed the brakes suddenly, a further determination is made in step S12 of whether the rear wheels Wr are attempting to lock. This determination is performed by the wheel lock determining unit 199 (shown in FIG. 15).

When it is determined in step S12 that the rear wheels Wr are attempting to lock, the excess torque generation prevention control is performed in step S3 and beyond. Meanwhile, when it is determined in step S12 that the rear wheels Wr are not attempting to lock, the control of step S7 is performed.

Moreover, the sudden brake determination in step S2 of the alternative embodiment may be provided with a sensitivity similar to that used in step S2 of the exemplary embodiment, however, the sensitivity provided in step S2 of the alternative embodiment may be raised higher than that used in the exemplary embodiment, because the existence of step S12 in the alternative embodiment enables a determination to be made with higher accuracy as to whether the rear wheels Wr are attempting to lock by observing the rotational state of the rear wheels Wr. Specifically, in step S2, a configuration may simply determine whether an operation was performed with a normal friction brake.

In this manner, in the alternative embodiment, because it is determined whether the rear wheels Wr are actually attempting to lock while observing the rotational state of the rear wheels Wr, in addition to the effect of the exemplary embodiment, excess torque generation prevention control can be performed smoothly according to the rotational state of the rear wheels Wr.

A second alternative embodiment of the main ECU 90 (shown in FIG. 12) is configured to perform the excess torque generation prevention control separately for each left and right rear wheel RWr and LWr. The rotational state of each rear wheel may be different for the right wheel RWr and left wheel LWr when the brakes are pressed suddenly, if the road conditions in contact with the wheels are different (for example, when snow remains on half of the road and one of the left or right rear wheels RWr or LWr contacts on a low μ road while the other contacts on a high μ road) or when a difference occurs in the balance of a load of the vehicle. Therefore, excess torque generation prevention control is performed separately for each left and right rear wheel RWr and LWr.

Figure 17:
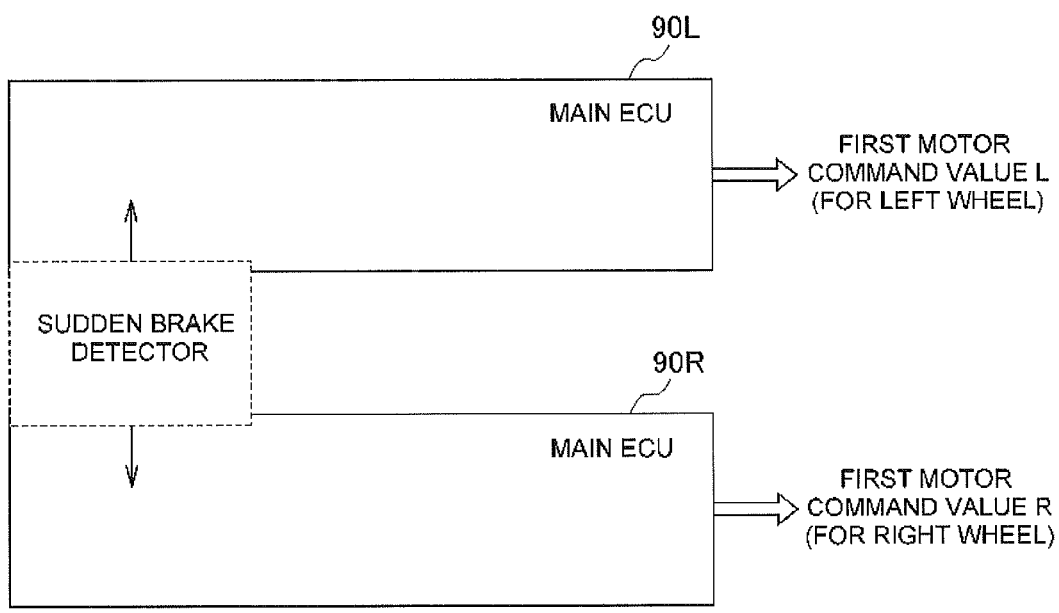
FIG. 17 is a system diagram of a second alternative embodiment of a main ECU that may be included in the control system shown in FIG. 11.

FIG. 17 is a system diagram of the second alternative embodiment of a main ECU that may be included in the control system shown in FIG. 11. In the second alternative embodiment, a respective main ECU 90L and 90R of the exemplary embodiment are provided for each left and right rear wheel RWr and LWr. The configuration of the main ECU in this case, as illustrated in FIG. 17, may share a configuration for the left and right sides that can be used in common, such as with the sudden brake detector 96 used for the main ECU 90L and 90R for each of the left and right rear wheel RWr and LWr.

With this type of configuration, because the vehicle 3 of the exemplary embodiment has a first PDU 80a, a first motor ECU 81a, and a main ECU 90 for each electric motor 2A and 2B to accommodate the left and right rear wheels RWr and LWr, the excess torque generation prevention control can be performed for each wheel after sudden braking by the vehicle 3 is detected.

In this manner, excess torque generation prevention control can be performed smoothly according to the rotational state of each of the left and right rear wheels RWr and LWr, in addition to the effect of the exemplary embodiment.

Moreover, the main ECU 190 of the first alternative embodiment described above may be used in place of the main ECU 90L and 90R used in the second alternative embodiment. In this case, because it can be determined whether excess torque generation prevention control is to be performed for each wheel, smoother excess torque generation prevention control can be performed while observing the rotational state of each rear wheel Wr.

However, the control systems described herein are not limited to the embodiments described above and may be suitably modified, improved, and the like.

In the embodiments described above, descriptions are given based on a configuration having the planetary gear type speed reducer 12 between the drive shaft 71 and the electric motor 2 for the rear wheels Wr, but the configuration may also include reducing mechanisms other than a planetary gear type speed reducer. In this case, in step S4 of FIG. 13 and FIG. 16, the moment of inertia from such speed reducer may be used as the moment of inertia of the rotating body that includes the rotor 15. In addition, a configuration may also directly connect the electric motor 2 and the rear wheels Wr by the drive shaft without providing the planetary gear type speed reducer 12.

In addition, in the embodiments described above, descriptions are given of examples in which a sudden brake is applied when the vehicle 3 is running forward by the driving force of the electric motor 2, but the embodiments are not limited to this. As long as the vehicle 3 drives by the driving force of the electric motor 2, it does not matter whether this is running forward or whether it is running in reverse. This is because, as long as the vehicle 3 is running by the driving force of the electric motor 2, there is a concern of excess torque being generated to the drive shaft 71 if the brakes are pressed suddenly. Therefore, the embodiments given above can also be applied in reverse (running in reverse) of the vehicle states illustrated in FIG. 10.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric motor control system included within a vehicle and communicatively coupled to at least one electric motor, the electric motor included within a running gear configured to rotate a drive shaft coupled to a first vehicle wheel, the control system comprising:
    a brake detector configured to identify sudden braking and output a sudden braking signal when sudden braking is identified;
    an inertia torque computing unit configured to determine an inertia torque of at least one rotating component included within the running gear and to determine a first torque command value based at least partially on the inertia torque; and
    a torque command value selector configured to receive the first torque command value and the sudden braking signal and to determine a first motor command value based at least partially on the first torque command value.

2. The electric motor control system in accordance with claim 1, wherein a torque output of the electric motor, operated in accordance with the first motor command value, reduces the inertia torque of the at least one rotating component that is transferred to the drive shaft during sudden braking.

3. The electric motor control system in accordance with claim 1, wherein the brake detector is configured to receive a signal corresponding to a level of vehicle braking comprising at least one of an output of a brake pedal sensor that detects a pressing operation and operation amount of a brake pedal by a driver and an output of a pedal torque sensor that detects the torque applied to at least one of an accelerator pedal and the brake pedal.

4. The electric motor control system in accordance with claim 1, further comprising a torque command value generator configured to determine a second torque command value associated with operation of the electric motor at times other than during sudden braking, and wherein the torque command value selector receives the second torque command value and determines the first motor command value based on the second torque command value when the brake detector has not identified sudden braking.

5. The electric motor control system in accordance with claim 1, further comprising a wheel lock determining unit configured to receive the sudden braking signal from the brake detector and to identify that the first wheel is attempting to lock.

6. The electric motor control system in accordance with claim 1, further comprising a rotation angular acceleration calculator configured to determine a rotation angular acceleration of at least one of the drive shaft and the wheel and to provide the rotation angular acceleration to the inertia torque computing unit.

7. The electric motor control system in accordance with claim 6, wherein the running gear also includes a speed reducer coupled between the electric motor and the drive shaft, and wherein the inertia torque computing unit is configured to determine the inertia torque of the at least one rotating component included in the vehicle running gear by adjusting a product of a moment of inertia of the at least one component and the rotation angular acceleration based on a reduction ratio of the speed reducer.

8. The electric motor control system in accordance with claim 1, wherein the at least one electric motor comprises a first electric motor and a second electric motor, the second electric motor included within a second running gear configured to rotate a second vehicle wheel, wherein the inertia torque computing unit is configured to determine an inertia torque of at least one rotating component included within the second running gear and to determine a second torque command value based at least partially on the inertia torque, and wherein the torque command value selector is configured to receive the second torque command value and the sudden braking signal and to determine a second motor command value based at least partially on the second torque command value.

9. A method for controlling an electric motor included in a vehicle, the electric motor included within a running gear configured to rotate a drive shaft, which is coupled to at least one vehicle wheel, the method comprising:
    receiving, at an electronic control unit (ECU), a braking signal corresponding to a level of vehicle braking;
    determining, using the ECU, an occurrence of sudden braking based on the signal;
    determining an inertia torque of at least one rotating component included within the running gear;
    determining a first torque command value based at least partially on the inertia torque that when applied to operation of the electric motor, reduces the inertia torque of the at least one rotating component that is transferred to the drive shaft during sudden braking; and providing a first motor command value to the electric motor, the first motor command value based at least partially on the first torque command value.

10. The method in accordance with claim 9, further comprising identifying, based at least partially on the braking signal, that the at least one vehicle wheel is attempting to lock.

11. The method in accordance with claim 9, wherein receiving a braking signal comprises receiving a signal from at least one of an output of a brake pedal sensor that detects a pressing operation and operation amount of a brake pedal by a driver and an output of a pedal torque sensor that detects the torque applied to at least one of an accelerator pedal and the brake pedal.

12. The method in accordance with claim 9, further comprising determining a second torque command value associated with operation of the electric motor at times other than during sudden braking, and wherein the torque command value selector receives the second torque command value and determines the first motor command value based on the second torque command value when the brake detector has not identified sudden braking.

13. The method in accordance with claim 9, wherein determining an inertia torque of at least one rotating component included within the running gear comprises determining a rotation angular acceleration of at least one of the drive shaft and the wheel.

14. The method in accordance with claim 13, wherein the running gear also includes a speed reducer coupled between the electric motor and the drive shaft, wherein determining the inertia torque further comprises adjusting a product of a moment of inertia of the at least one component and the rotation angular acceleration based on a reduction ratio of the speed reducer.

15. The method in accordance with claim 9, wherein the at least one wheel comprises a first wheel and a second wheel, and wherein determining an inertia torque of at least one rotating component included within the running gear comprises:
  determining a first inertia torque of at least one rotating component associated with the first wheel;
  determining a second inertia torque of at least one rotating component associated with the second wheel;
  determining a first torque command value based at least partially on the first inertia torque that when applied to operation of a first electric motor, reduces the inertia torque of the at least one rotating component that is transferred during sudden braking to a drive shaft associated with the first wheel; and
  determining a second torque command value based at least partially on the second inertia torque that when applied to operation of a second electric motor, reduces the inertia torque of the at least one rotating component that is transferred during sudden braking to a drive shaft associated with the second wheel.

* * * * *